United States Patent
Kobori

(10) Patent No.: US 10,013,125 B2
(45) Date of Patent: Jul. 3, 2018

(54) ELECTRONIC APPARATUS

(71) Applicant: Wacom Co., Ltd., Saitama (JP)

(72) Inventor: Takeshi Kobori, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 113 days.

(21) Appl. No.: 15/163,121

(22) Filed: May 24, 2016

(65) Prior Publication Data

US 2016/0266686 A1    Sep. 15, 2016

Related U.S. Application Data

(63) Continuation of application No. PCT/JP2014/078860, filed on Oct. 30, 2014.

(30) Foreign Application Priority Data

Nov. 27, 2013   (JP) ................................ 2013-244821

(51) Int. Cl.
*G06F 3/046* (2006.01)
*G06F 3/044* (2006.01)
*G06F 3/041* (2006.01)

(52) U.S. Cl.
CPC .............. *G06F 3/044* (2013.01); *G06F 3/041* (2013.01); *G06F 3/046* (2013.01); *G06F 2203/04108* (2013.01); *G06F 2203/04112* (2013.01)

(58) Field of Classification Search
CPC . G06F 2203/04108; G06F 2203/04112; G06F 3/041; G06F 3/044; G06F 3/046
USPC .................................................. 345/170–176
See application file for complete search history.

(56) References Cited

U.S. PATENT DOCUMENTS

| 2010/0079384 A1* | 4/2010 | Grivna | G06F 3/041 345/173 |
| 2010/0079794 A1* | 4/2010 | Kim | G06F 3/023 358/1.15 |
| 2011/0285647 A1* | 11/2011 | Imamura | G06F 1/1616 345/173 |

(Continued)

FOREIGN PATENT DOCUMENTS

| JP | 2002-297302 A | 10/2002 |
| JP | 2012-14411 A | 1/2012 |

(Continued)

OTHER PUBLICATIONS

International Search Report dated Jan. 20, 2015 for corresponding International Application No. PCT/JP2014/078860, 3 pages.

*Primary Examiner* — Tony Davis
(74) *Attorney, Agent, or Firm* — Seed Intellectual Property Law Group LLP

(57) ABSTRACT

Disclosed is an electronic apparatus including: a first sensor having a first indication input surface for detecting a position indicated by an indicating object; a second sensor having a second indication input surface for detecting the indicating object, the second indication input surface being disposed adjacent to the first indication input surface of the first sensor in a direction along a surface direction of the first indication input surface; and a controller which, in operation, controls a scan operation for detecting the position indicated by the indicating object in the first indication input surface of the first sensor when the indicating object is detected in the second sensor.

20 Claims, 19 Drawing Sheets

(56) References Cited

U.S. PATENT DOCUMENTS

| | | | |
|---|---|---|---|
| 2012/0044197 A1* | 2/2012 | Polishchuk | G06F 3/044 |
| | | | 345/174 |
| 2012/0056832 A1* | 3/2012 | Miyazaki | G06F 3/04883 |
| | | | 345/173 |
| 2012/0072853 A1 | 3/2012 | Krigström et al. | |
| 2013/0215049 A1 | 8/2013 | Lee | |
| 2013/0249854 A1* | 9/2013 | Katsurahira | G06F 3/0416 |
| | | | 345/174 |
| 2013/0265276 A1* | 10/2013 | Obeidat | G06F 3/044 |
| | | | 345/174 |
| 2014/0101578 A1* | 4/2014 | Kwak | G06F 3/017 |
| | | | 715/761 |
| 2014/0184628 A1* | 7/2014 | Lee | G06F 3/1423 |
| | | | 345/545 |
| 2014/0210740 A1* | 7/2014 | Lee | G06F 3/0488 |
| | | | 345/173 |
| 2014/0253492 A1* | 9/2014 | Maharyta | G06F 3/044 |
| | | | 345/174 |
| 2014/0370811 A1* | 12/2014 | Kang | H04W 84/18 |
| | | | 455/41.2 |
| 2015/0182146 A1* | 7/2015 | Hidaka | G01N 33/497 |
| | | | 455/418 |

FOREIGN PATENT DOCUMENTS

| | | |
|---|---|---|
| JP | 2012-519442 A | 8/2012 |
| JP | 2013-168121 A | 8/2013 |
| WO | 2013/129304 A1 | 9/2013 |

\* cited by examiner

ELECTRONIC APPARATUS

BACKGROUND

Technical Field

This disclosure relates to an electronic apparatus including a sensor unit for an indicating object.

Description of the Related Art

Examples have been increasing in which a sensor unit with which input operations can be made by using a pen-type position indicator, a finger, or the like as an indicating object is used as an input device incorporated in an electronic apparatus. The following fact is one cause thereof. Specifically, this kind of sensor unit can be formed by providing transparent conductors over a transparent substrate. Therefore, if the electronic apparatus includes a display screen, the sensor unit can be disposed to overlap with the display screen and a space for the input device is not particularly needed around a displayed image. This can form the electronic apparatus as small-size apparatus.

In the sensor unit, the plural transparent conductors disposed over the transparent substrate are sequentially scanned to search for the transparent conductor from which a signal transmitted from the indicating object or a signal that is originally transmitted from the sensor unit and returns via the indicating object is detected or search for the transparent conductor whose capacitance changes on the basis of indication by the indicating object. The position of the indicating object is thereby detected corresponding to the position of the transparent conductor from which the signal is detected or the change in the capacitance is detected.

In this case, if the number of transparent conductors that should be scanned is large, the scan time becomes long and the speed of detection of the indicating object decreases in the case of always scanning all of these transparent conductors. Therefore, if the indicating object is moved at high speed in the sensor unit, the speed of detection of the indicating object comes to fail in keeping up with the movement speed of the indicating object and the lowering of the following capability, i.e., the state in which the indicating object cannot be detected in such a manner as to follow the movement, occurs. For this reason, for example in drawing software such as Paintbrush, the motion of an indicating object is coarsely expressed when a scan result of the indicating object is displayed.

The following method has been proposed as a related art. Specifically, in this method, when the position of an indicating object is detected in a sensor unit, a local scan (partial scan) of scanning transparent conductors only around the detected position is carried out. The lowering of the following capability with respect to the high-speed movement of the indicating object due to scanning of the whole of the transparent conductors in the sensor unit (hereinafter, this will be referred to as the all-scan (overall scan)) is thereby covered (for example, Japanese Patent Laid-open No. 2002-297302 and Japanese Patent Laid-open No. 2013-168121).

By the way, as indicated in FIG. 21A for example, there has been the following apparatus as portable apparatus 1 such as a mobile phone terminal in recent years. Specifically, in this apparatus, besides a main indication input unit 3 formed of a sensor unit (not indicated) disposed to overlap with a display screen 2, peripheral indication input units 4A and 4B or the like having functions of button keys for example are provided at a peripheral part of the display screen 2.

In this case, when an indicating object detected by the main indication input unit 3 is a pen-type position indicator, the following troublesome operation is necessary if the peripheral indication input units 4A and 4B are formed of mechanical push-button keys. Specifically, after operating the peripheral indication input unit 4A or 4B formed of the push-button key with a finger, a user holds the pen-type position indicator with the same hand and operates the main indication input unit 3 formed of the sensor unit made to overlap with the display screen 2. Alternatively, the user operates the peripheral indication input unit 4A or 4B formed of the push-button key with one hand and holds the pen-type position indicator with the other hand to operate the main indication input unit 3.

Accordingly, in apparatus of a related art, the button keys of the peripheral indication input units 4A and 4B are also formed of a sensor unit of the same indicating object detection system as the main indication input unit 3. In this case, generally, as indicated in FIG. 21B, a sensor unit 5 forming the main indication input unit 3 is formed to be increased in size and have a wide detection region so that the indicating object can be detected also in the regions of the peripheral indication input units 4A and 4B. In addition, a region 2' (see a dotted line in FIG. 21B) corresponding to the display region 2 is set to detect the indicating object as the region of the main indication input unit 3 and regions 4A' and 4B' (see dotted lines in FIG. 21B) corresponding to the peripheral indication input units 4A and 4B are set to detect the indicating object as detection regions of button key operation.

The sensor unit 5 of the example of FIG. 21B is a sensor unit of the electromagnetic induction system and is composed of a loop coil group 5X formed by arranging plural loop coils in a first direction (e.g., X-axis direction) and a loop coil group 5Y formed by arranging plural loop coils in a second direction (Y-axis direction) orthogonal to the first direction.

According to such a configuration, a user can make indication input operation to the peripheral indication input units 4A and 4B and the main indication input unit 3 corresponding to the display screen 2 by holding the portable apparatus with one hand and holding, e.g., a pen-type position indicator with the other hand, which is convenient.

However, if the sensor unit 5 is formed to have a detection region including the main indication input unit 3 and the peripheral indication input units 4A and 4B as above, there is a problem that the sensor unit 5 structurally having a large area is necessary and it becomes difficult to respond to requests for size reduction of the portable apparatus for recent years and narrowing of a so-called frame around the display screen.

Then, it will be available to form the sensor unit having the region of the main indication input unit 3 corresponding to the display screen 2 as the indication input region and the sensor unit having the region of each of the peripheral indication input units 4A and 4B as the indication input region by different sensor units from each other. This can reduce the size of the peripheral indication input units 4A and 4B set to obtain functions of button keys and thus reduce the above-described problems of size increase of the portable apparatus and so forth.

However, if the plural sensor units are provided in this manner, another problem is caused. Specifically, when a position indicator is located at the peripheral indication input unit 4A or 4B, the position indicator is not being detected in the main indication input unit 3. Thus, the sensor unit 5 is in the all-scan state in which all loop coils of the loop coil groups 15X and 15Y are sequentially scanned and is in the state in which the speed of detection of the indicating object is lowered. Therefore, when the position indicator is moved from the position of the peripheral indication input unit 4A or 4B to the main indication input unit 3, if the speed of the movement of the position indicator is high, possibly the indicating object cannot be detected at the circumferential part in the region of the main indication input unit 3 and the track of the indicating object is lost, so that it takes a long time to detect the indicating object in the main indication input unit 3.

Furthermore, also when the position indicator is located, e.g., near the peripheral indication input unit 4A or 4B in the region of the main indication input unit 3, the following problem is caused if the sensor unit always carries out scan operation for detection of the indicating object in the peripheral indication input units 4A and 4B. Specifically, also when a user makes the position indicator touch the peripheral indication input unit 4A or 4B by mistake carelessly, possibly the peripheral indication input unit 4A or 4B detects the position indicator and the portable apparatus carries out operation corresponding to this detection result.

This disclosure intends to provide an electronic apparatus that is configured to be capable of solving the above problems and includes a sensor unit and a position detecting circuit that detects a position indicated by an indicating object in the sensor unit.

BRIEF SUMMARY

To solve the above-described problems, an aspect of this disclosure provides an electronic apparatus including a first sensor unit having a first indication input surface for detecting a position indicated by an indicating object and a second sensor unit having a second indication input surface for detecting the indicating object. The second indication input surface is disposed close to the first indication input surface of the first sensor unit in a direction along the surface direction of the first indication input surface. Furthermore, the electronic apparatus includes a control unit that controls scan operation for detecting a position indicated by the indicating object in the first indication input surface of the first sensor unit when the indicating object is detected in the second sensor unit.

In one aspect of this disclosure, the first sensor unit and the second sensor unit are disposed in such a manner that the first indication input surface and the second indication input surface are close to each other. When the indicating object is detected in the second sensor unit, scan operation for detecting a position indicated by the indicating object in the first indication input surface in the first sensor unit is controlled.

For example, when the indicating object is detected in the second sensor unit, the control unit carries out control to make a pause in the scan operation in the first sensor unit. Due to this, even when the user moves the indicating object detected in the second sensor unit to the first sensor unit by mistake, the detection output of the indicating object is not obtained in this first sensor unit and thus a malfunction can be prevented.

Furthermore, when the indicating object is detected in the second sensor unit, the control unit carries out control to make not the all-scan (overall scan) but the local scan (partial scan) in a near area to the second sensor unit in the first indication input surface of the first sensor unit.

This makes it possible to detect the indicating object in the first sensor unit with a favorable following characteristic also when the indicating object moves from the second sensor unit to the first sensor unit.

When the indicating object is detected in the second sensor unit, the local scan (partial scan) and the all-scan may be carried out in a time-sharing manner in the near area to the second sensor unit in the first indication input surface of the first sensor unit.

According to one aspect of this disclosure, the electronic apparatus is so configured that the scan operation for detecting a position indicated by the indicating object in the first indication input surface in the first sensor unit is controlled when the indicating object is detected in the second sensor unit. This can favorably solve the problems of the case in which plural sensor units are disposed close to each other.

DETAILED DESCRIPTION

Some electronic apparatuses according to several embodiments of this disclosure will be described below with reference to the drawings.

First Embodiment; FIGS. 1A to 6B

Figure 1A:
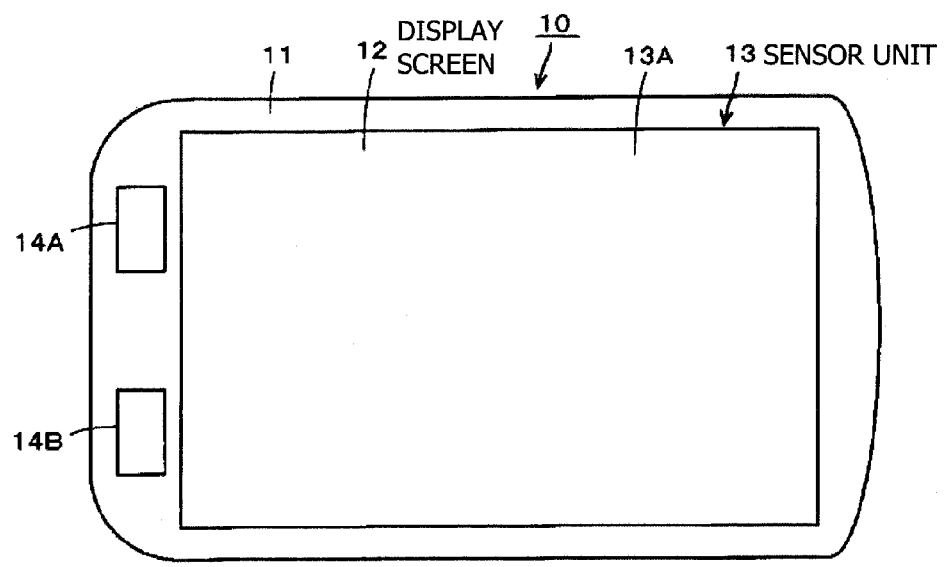
FIGS. 1A and 1B are diagrams for explaining a configuration example of an electronic apparatus according to a first embodiment of this disclosure.
Figure 1B:
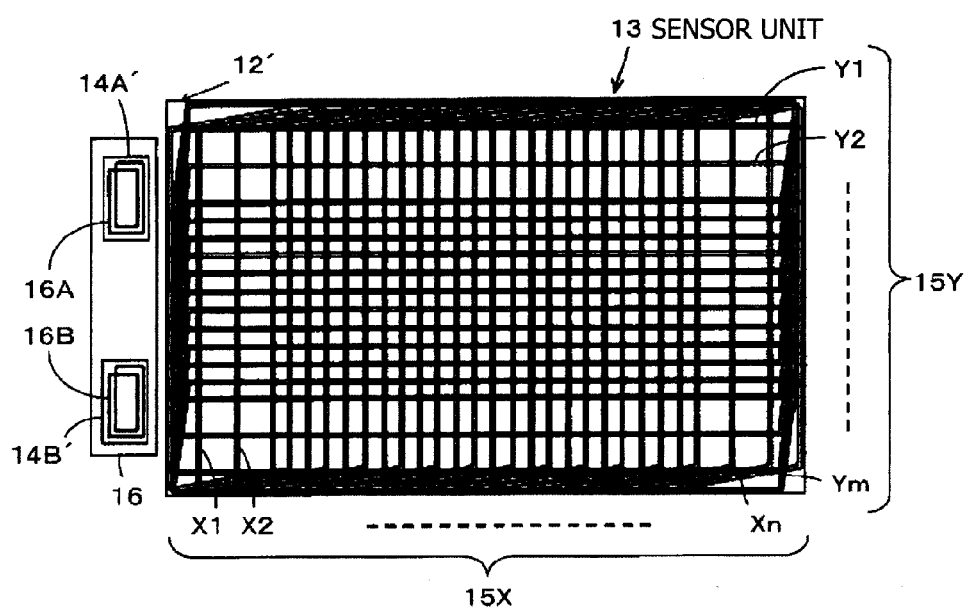

FIG. 1A is a diagram for indicating an example of the appearance of an electronic apparatus 10 of a first embodiment of this disclosure and FIG. 1B is a diagram indicating a configuration example of sensor units provided in the electronic apparatus 10 of this first embodiment.

The electronic apparatus 10 of this example is a high-function mobile phone terminal referred to as a so-called smartphone. On one surface side of a thin, flattened casing 11 having a substantially rectangular parallelepiped shape, a display screen 12 of a display device formed of, e.g., a liquid crystal display (LCD) is provided to be in a visible state. A display-corresponding sensor unit 13 is provided in an overlapping manner under this display screen 12 and an indication input surface 13A thereof has almost the same region area as the whole surface of the display screen 12. Detection of an indicating object is possible in the whole region of the indication input surface 13A of the display-corresponding sensor unit 13. Therefore, the region of the indication input surface 13A serves as the indicating object detection region of the display-corresponding sensor unit 13.

In this example, the display-corresponding sensor unit 13 is provided with a configuration of a sensor unit of an electromagnetic induction system. As indicated in FIG. 1B, the display-corresponding sensor unit 13 includes a loop coil group 15X arranged in a first direction (longitudinal direction of the casing 11; X-axis direction) and a loop coil group 15Y arranged in a second direction (Y-axis direction) orthogonal to the first direction in such a manner as to cover the whole region of the indication input surface 13A.

As indicated in FIG. 1B, the loop coil group 15X is composed of n (n is an integer equal to or larger than 2, e.g., 40) loop coils X1, X2, . . . , Xn arranged in the X-axis direction in this example. Furthermore, the loop coil group 15Y is composed of m (m is an integer equal to or larger than 2, e.g., 20) loop coils Y1, Y2, . . . , Ym arranged in the Y-axis direction in this example. In FIG. 1B, a rectangular region indicated by being surrounded by a solid line 12' is the region of the display screen 12.

In the display-corresponding sensor unit 13, the plural loop coils X1 to Xn and Y1 to Ym are formed over a substrate and disposed under the display screen 12.

Furthermore, as indicated in FIG. 1A, in a region that exists on one side of the casing 11 in the longitudinal direction (X-axis direction) and is different from the display screen 12, key-corresponding indication input regions 14A and 14B are provided close to the display screen 12. At the part corresponding to these key-corresponding indication input regions 14A and 14B in the casing 11, a key-corresponding sensor unit 16 of the same electromagnetic induction system as the display-corresponding sensor unit 13 is provided as indicated in FIG. 1B. This key-corresponding sensor unit 16 is configured by forming loop coils 16A and 16B over the substrate corresponding to the key-corresponding indication input regions 14A and 14B, respectively.

Figure 2:
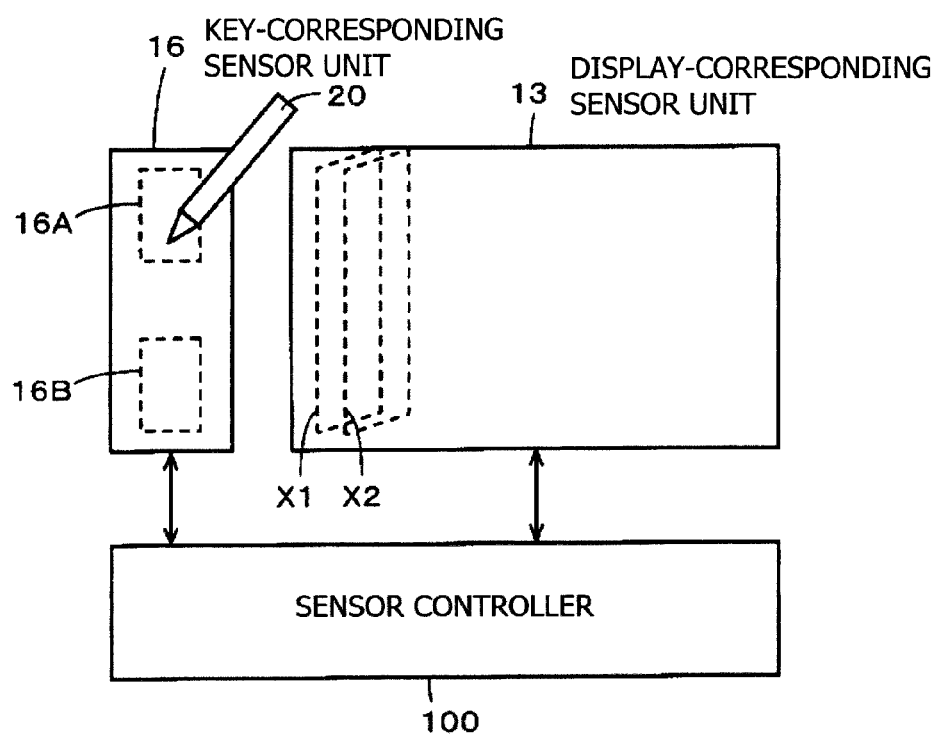
FIG. 2 is a diagram for explaining part of the electronic apparatus according to the first embodiment of this disclosure.

In the electronic apparatus 10 of this first embodiment, as indicated in FIG. 2, the display-corresponding sensor unit 13 and the key-corresponding sensor unit 16 are connected to a sensor controller 100. This sensor controller 100 forms a control circuit of the electronic apparatus 10.

The sensor controller 100 controls a scan operation about the plural loop coils X1 to Xn and Y1 to Ym of the loop coil groups 15X and 15Y of the display-corresponding sensor unit 13, and a controls scan operation about the two loop coils 16A and 16B of the key-corresponding sensor unit 16.

Furthermore, from the scan result in the display-corresponding sensor unit 13, the sensor controller 100 executes detection processing of a position indicated by an indicating object, specifically a pen-type position indicator 20 corresponding to the electromagnetic induction system in this example, on the indication input surface (indication input region) 13A. In addition, from the scan result about the two loop coils 16A and 16B in the key-corresponding sensor unit 16, the sensor controller 100 executes detection processing about whether or not the position indicator 20 is being detected in either key-corresponding indication input region 14A or 14B.

When the position indicator 20 is being detected in none of the indication input surface 13A corresponding to the display screen 12 and the key-corresponding indication input regions 14A and 14B, the sensor controller 100 carries out the all-scan for the display-corresponding sensor unit 13, specifically sequentially scans all loop coils X1 to Xn and Y1 to Ym of the display-corresponding sensor unit 13 at a first speed, specifically, e.g., at time intervals of 125 milliseconds. In addition, for the key-corresponding sensor unit 16, the sensor controller 100 alternately scans the loop coils 16A and 16B at the first speed in the all-scan, specifically at time intervals of 125 milliseconds in this example.

When the position indicator 20 is detected on the indication input surface 13A, for the display-corresponding sensor unit 13, the sensor controller 100 carries out the local scan of sequentially scanning only plural loop coils near the detected position of the position indicator 20 at a second speed higher than the first speed, specifically every 7.5 milliseconds for example. On the other hand, regarding the key-corresponding sensor unit 16, the sensor controller 100 makes a pause of the scan in this example.

In the local scan for the display-corresponding sensor unit 13, for example when the position indicator 20 is detected at the position of the intersection of the loop coil Xi and the loop coil Yj (i and j are integers), the sensor controller 100 sequentially scans plural loop coils centered at the loop coil Xi, e.g., three loop coils Xi−1, Xi, and Xi+1 and plural loop coils centered at the loop coil Yj, e.g., three loop coils Yj−1, Yj, and Yj+1.

When the position indicator 20 is detected in either key-corresponding indication input region 14A or 14B, for the key-corresponding sensor unit 16, the sensor controller 100 alternately scans the loop coils 16A and 16B at the second speed of the local scan, specifically at time intervals of 7.5 milliseconds in this example. In addition, for the display-corresponding sensor unit 13, the sensor controller 100 carries out not the all-scan but the local scan at the second speed about only loop coils in a circumferential area in the display-corresponding sensor unit 13 close to the key-corresponding sensor unit 16 (hereinafter, the scan at this time will be referred to as the near-area scan).

In this first embodiment, the key-corresponding sensor unit 16 is disposed close to the display-corresponding sensor unit 13 in the X-axis direction. Thus, in the display-corresponding sensor unit 13, the near-area scan is carried out about one or plural loop coils close to the key-corresponding sensor unit 16, specifically two loop coils X1 and X2 in this example, in the loop coil group 15X arranged in the X-axis direction.

If such a near-area scan is carried out, even when the position indicator 20 is moved from the key-corresponding sensor unit 16 to the display-corresponding sensor unit 13 at high speed, the position indicator 20 can be detected in the display-corresponding sensor unit 13 with a favorable following characteristic.

In this case, in this example, it suffices that it can be detected that the position indicator 20 being detected in the key-corresponding sensor unit 16 moves to the display-corresponding sensor unit 13 along the X-axis direction. Therefore, it is enough to scan only the loop coils X1 and X2, which are arranged in the X-axis direction and are close to the key-corresponding sensor unit 16. The loop coils in the loop coil group 15Y arranged in the Y-axis direction do not need to be scanned.

Figure 3:
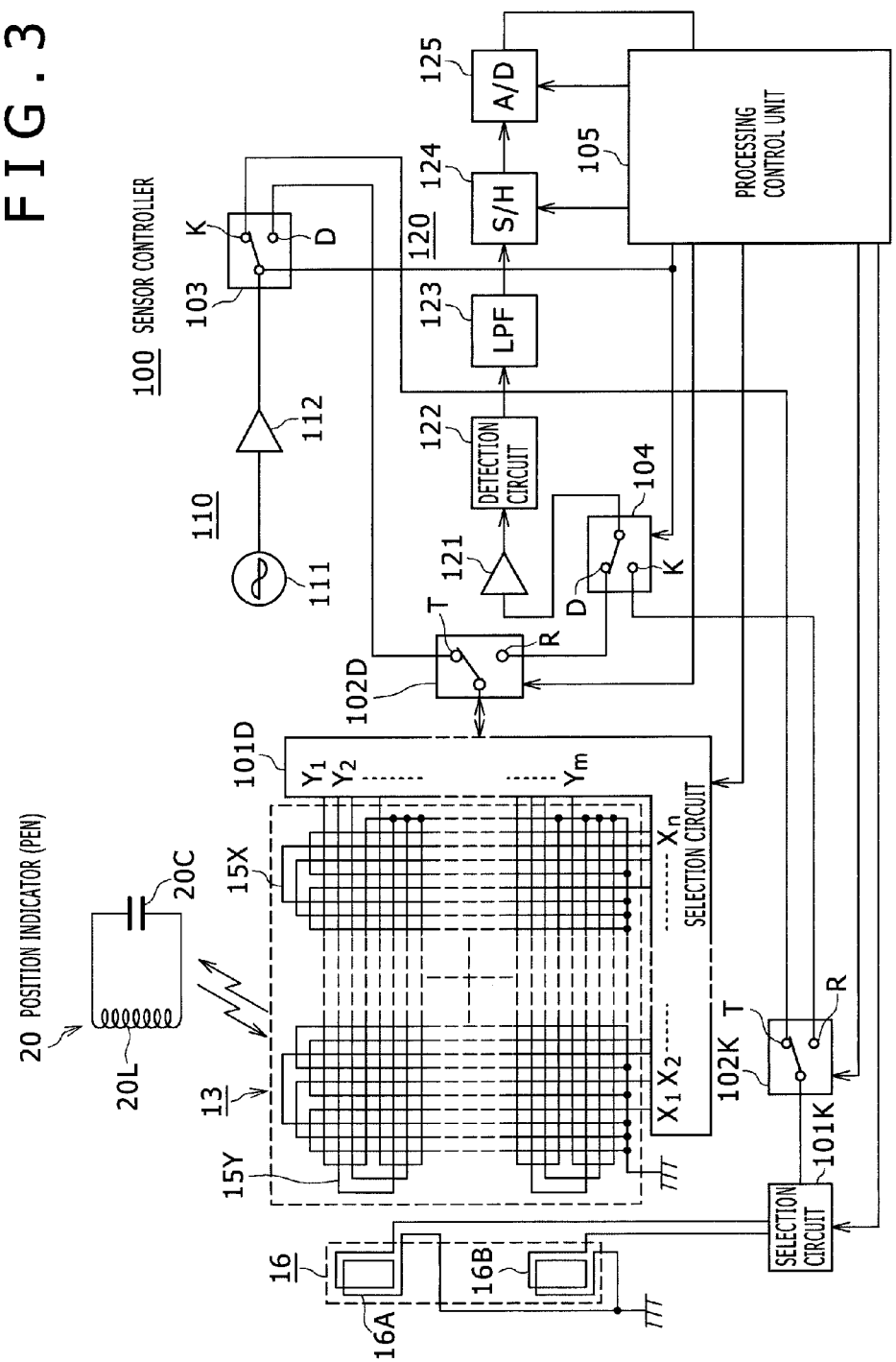
FIG. 3 is a diagram indicating a configuration example of part of the electronic apparatus according to the first embodiment of this disclosure.

FIG. 3 indicates a detailed configuration example of the respective units in FIG. 2, particularly a detailed configuration example of the control circuit part formed of the sensor controller 100. In the example of FIG. 3, the circuit configuration of the pen-type position indicator 20 used with the sensor units of the electromagnetic induction system in this example is also indicated. Specifically, as indicated in FIG. 3, the position indicator 20 includes a resonant circuit composed of a coil 20L and a capacitor 20C connected to this coil 20L in parallel.

As described above, in the display-corresponding sensor unit 13, the X-axis direction loop coil group 15X and the Y-axis direction loop coil group 15Y are formed on the front and back sides of a substrate. The plural loop coils X1 to Xn and loop coils Y1 to Ym forming the X-axis direction loop coil group 15X and the Y-axis direction loop coil group 15Y, respectively, are disposed to overlap with each other also as indicated in FIG. 1B.

The plural loop coils X1 to Xn forming the loop coil group 15X are disposed to line up at equal intervals and sequentially overlap with each other in the X-axis direction of the detection region for detecting the position indicator 20. Furthermore, the plural loop coils Y1 to Ym forming the loop coil group 15Y are also disposed to line up at equal intervals and sequentially overlap with each other in the Y-axis direction of the detection region.

Furthermore, e.g., a rectangular loop coil of two turns is employed as each of the loop coils 16A and 16B of the key-corresponding sensor unit 16.

The sensor controller 100 includes the following components: a selection circuit 101D and a transmission/reception changeover switch circuit 102D that are for the display-corresponding sensor unit 13; a selection circuit 101K and a transmission/reception changeover switch circuit 102K that are for the key-corresponding sensor unit 16; a transmission signal generating circuit 110 and a received signal processing circuit 120 that are shared by the display-corresponding sensor unit 13 and the key-corresponding sensor unit 16; sensor changeover switch circuits 103 and 104 for switching the connection target of the shared transmission signal generating circuit 110 and received signal processing circuit 120 between the display-corresponding sensor unit 13 and the key-corresponding sensor unit 16; and a processing control unit 105. The processing control unit 105 is formed of a microcomputer.

The selection circuit 101D is connected to the X-axis direction loop coil group 15X and the Y-axis direction loop coil group 15Y of the display-corresponding sensor unit 13. This selection circuit 101D sequentially selects one loop coil in the loop coil groups 15X and 15Y of the display-corresponding sensor unit 13 in accordance with a selection control signal from the processing control unit 105. The one loop coil selected by the selection circuit 101D is connected to a movable terminal of the transmission/reception changeover switch circuit 102D.

The selection circuit 101K is connected to the loop coils 16A and 16B of the key-corresponding sensor unit 16 and selects either one of the loop coils 16A and 16B in accordance with a selection control signal from the processing control unit 105. The one loop coil selected by the selection circuit 101K is connected to a movable terminal of the transmission/reception changeover switch circuit 102K.

The processing control unit 105 controls the selection of the loop coil in the selection circuit 101D and the selection circuit 101K and controls the speed of the selection to thereby carry out the above-described all-scan, local scan, and near-area scan.

The processing control unit 105 executes detection processing of the position indicated by the position indicator 20 in the display-corresponding sensor unit 13 and executes detection processing of the position indicator 20 in the key-corresponding sensor unit 16 as described later. On the basis of the result of the detection processing of the position indicated by the position indicator 20 in the display-corresponding sensor unit 13 and the result of the detection processing of the position indicator 20 in the key-corresponding sensor unit 16, the processing control unit 105 generates the selection control signals to be supplied to the selection circuits 101D and 101K to control scan operation for the display-corresponding sensor unit 13 and the key-corresponding sensor unit 16.

The transmission/reception changeover switch circuits 102D and 102K are circuits for switching between transmission and reception of a signal at the time of the scan for the display-corresponding sensor unit 13 and the key-corresponding sensor unit 16. On the basis of control by the processing control unit 105, the transmission/reception changeover switch circuits 102D and 102K switch the connection targets (transmission-side terminal T and reception-side terminal R) to which the loop coils selected by the selection circuits 101D and 101K are connected every predetermined time, enabling switching between transmission and reception in a time-sharing manner.

That is, the processing control unit 105 can switch the changeover switch circuit 102D to the side of the terminal T when a transmission signal is supplied to the display-corresponding sensor unit 13, and to the side of the terminal R when a received signal is obtained from the display-corresponding sensor unit 13.

Furthermore, on the basis of control by the processing control unit 105, the changeover switch circuit 102K is switched to the side of the terminal T when a transmission signal is supplied to the key-corresponding sensor unit 16, and to the side of the terminal R when a received signal is obtained from the key-corresponding sensor unit 16.

By the processing control unit 105, the sensor changeover switch circuits 103 and 104 are switched to the side of a terminal D when a scan for the display-corresponding sensor unit 13 is carried out and are switched to the side of a terminal K when a scan for the key-corresponding sensor unit 16 is carried out.

A movable terminal of the sensor changeover switch circuit 103 is connected to the output terminal of the transmission signal generating circuit 110. In addition, the side of the terminal D is connected to the side of the transmission-side terminal T of the transmission/reception changeover switch circuit 102D and the side of the terminal K is connected to the side of the transmission-side terminal T of the transmission/reception changeover switch circuit 102K. A movable terminal of the sensor changeover switch circuit 104 is connected to the input terminal of the received signal processing circuit 120. In addition, the side of the terminal D is connected to the side of the terminal R of the transmission/reception changeover switch circuit 102D and the side of the terminal K is connected to the side of the reception-side terminal R of the transmission/reception changeover switch circuit 102K.

The transmission signal generating circuit 110 is composed of an oscillator 111 that generates an AC signal of a predetermined frequency f0 and a current driver 112. The AC signal of the frequency f0 generated from the oscillator 111 of the transmission signal generating circuit 110 is supplied to the current driver 112 and is converted to a current. Then, the current is supplied to the movable terminal of the changeover switch circuit 103.

The received signal processing circuit 120 includes a receiving amplifier 121, a detection circuit 122, a low-pass filter 123, a sample-hold circuit 124, and an analog-to-digital (A/D) conversion circuit 125. The movable terminal of the sensor changeover switch circuit 104 is connected to the input terminal of the receiving amplifier 121 of the received signal processing circuit 120.

In the above configuration, the processing control unit 105 switches the sensor changeover switch circuits 103 and 104 to the side of the terminal D at the time of the scan of the display-corresponding sensor unit 13. At this time, the output terminal of the transmission signal generating circuit 110 is connected to the transmission-side terminal T of the transmission/reception changeover switch circuit 102D through the sensor changeover switch circuit 103. Furthermore, the reception-side terminal R of the transmission/reception changeover switch circuit 102D is connected to the input terminal of the received signal processing circuit 120 through the sensor changeover switch circuit 104.

Therefore, when the transmission/reception changeover switch circuit 102D is switched to the transmission-side terminal T by the processing control unit 105, the AC signal of the frequency f0 from the oscillator 111 is transmitted to the selection circuit 101D through the current driver 112, the sensor changeover switch circuit 103, and the transmission/reception changeover switch circuit 102D. Due to this, at the time of this transmission, the AC signal from the transmission signal generating circuit 110 is supplied to the loop coil selected by the selection circuit 101D.

Furthermore, when the transmission/reception changeover switch circuit 102D is switched to the reception-side terminal R by the processing control unit 105, the loop coil selected by the selection circuit 101D is connected to the input terminal of the receiving amplifier 121 of the received signal processing circuit 120 via the selection circuit 101D and the reception-side terminal R of the transmission/reception changeover switch circuit 102D.

The signal amplified by the receiving amplifier 121 is supplied to the detection circuit 122 and is subjected to detection. The signal resulting from the detection by the detection circuit 122 is supplied to the A/D conversion circuit 125 via the low-pass filter 123 and the sample-hold circuit 124. The analog signal is converted to a digital signal in the A/D conversion circuit 125 and the digital signal is supplied to the processing control unit 105.

At this time, the processing control unit 105 carries out control for the scan of the display-corresponding sensor unit 13 and control for position detection. Specifically, the processing control unit 105 controls selection control of the loop coil in the selection circuit 101D, transmission/reception switching control in the transmission/reception changeover switch circuit 102D, the timing of the sample-hold circuit 124, and so forth.

By switching the transmission/reception changeover switch circuit 102D to the transmission-side terminal T, the processing control unit 105 carries out current application control of the loop coil selected by the selection circuit 101D in the X-axis direction loop coil group 15X or the Y-axis direction loop coil group 15Y and causes the loop coil to transmit electromagnetic waves. At this time, when a position is indicated by the position indicator 20 as an indicating object over the display-corresponding sensor unit 13, the resonant circuit of the position indicator 20 receives the electromagnetic waves transmitted from this loop coil and stores energy.

Next, when the processing control unit 105 switches the transmission/reception changeover switch circuit 102D to the reception-side terminal R, an induced voltage is generated in the respective loop coils of the X-axis direction loop coil group 15X and the Y-axis direction loop coil group 15Y due to electromagnetic waves transmitted from the position indicator 20 when the position indicator 20 is indicating a position over the display-corresponding sensor unit 13. Based on the level of the voltage value of this induced voltage generated in the respective loop coils, the processing control unit 105 calculates the X-axis direction and Y-axis direction coordinate values of the position indicated by the position indicator 20 in the indication input region of the display-corresponding sensor unit 13. When the position indicator 20 is not indicating a position over the display-corresponding sensor unit 13, at the time of reception, the above-described induced voltage is not obtained from the loop coil selected by the selection circuit 101D because the transmission signal from the position indicator 20 is not being sent to the loop coils. Thus, the processing control unit 105 determines that the position indicator 20 is not being detected.

Next, at the time of the scan of the key-corresponding sensor unit 16, the processing control unit 105 switches the sensor changeover switch circuits 103 and 104 to the side of the terminal K. Therefore, the output terminal of the transmission signal generating circuit 110 is connected to the transmission-side terminal T of the transmission/reception changeover switch circuit 102K through the sensor changeover switch circuit 103. Furthermore, the reception-side terminal R of the transmission/reception changeover switch circuit 102K is connected to the input terminal of the received signal processing circuit 120 through the sensor changeover switch circuit 104.

At this time, the processing control unit 105 controls switching of the two loop coils 16A and 16B by the selection circuit 101K and controls switching of the transmission/reception changeover switch circuit 102K. Thereby, similarly to the case of the display-corresponding sensor unit 13, the processing control unit 105 determines whether or not the position indicator 20 is detected and, when the position indicator 20 is detected, determines which of the two key-corresponding indication input regions 14A and 14B the position indicator 20 is detected in.

In the above-described manner, in the first embodiment, the processing control unit 105 carries out detection of the position indicated by the position indicator 20 about the display-corresponding sensor unit 13 and the key-corresponding sensor unit 16. For this detection, as described above, the processing control unit 105 controls scan operation in the display-corresponding sensor unit 13 and the key-corresponding sensor unit 16 disposed close to each other to avoid the problem of delay in the detection accompanying the movement of the position indicator 20 to the different sensor unit.

Figure 4:
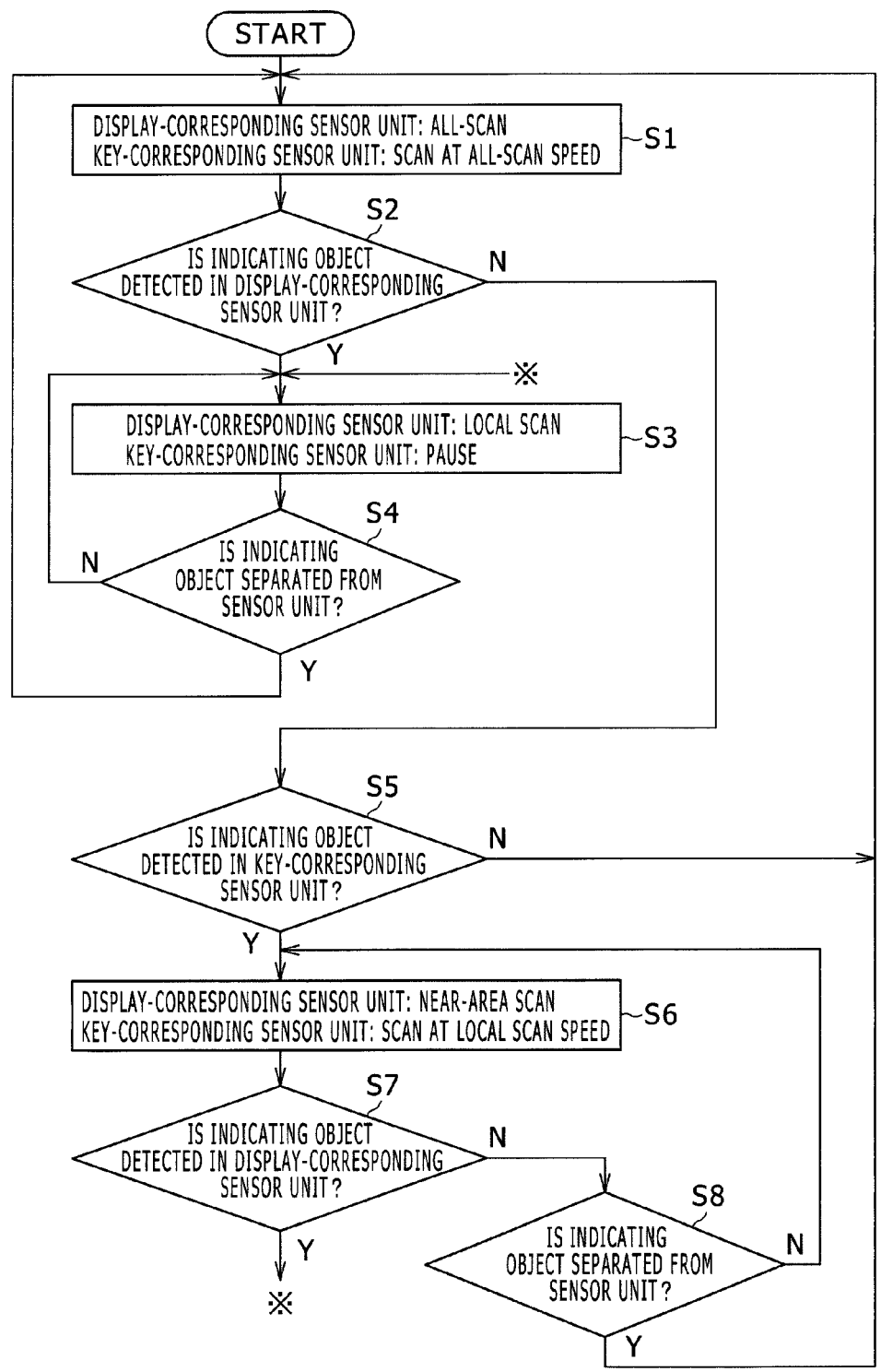
FIG. 4 is a diagram indicating a flowchart for explaining a processing operation example of part of the electronic apparatus according to the first embodiment of this disclosure.
Figure 5:
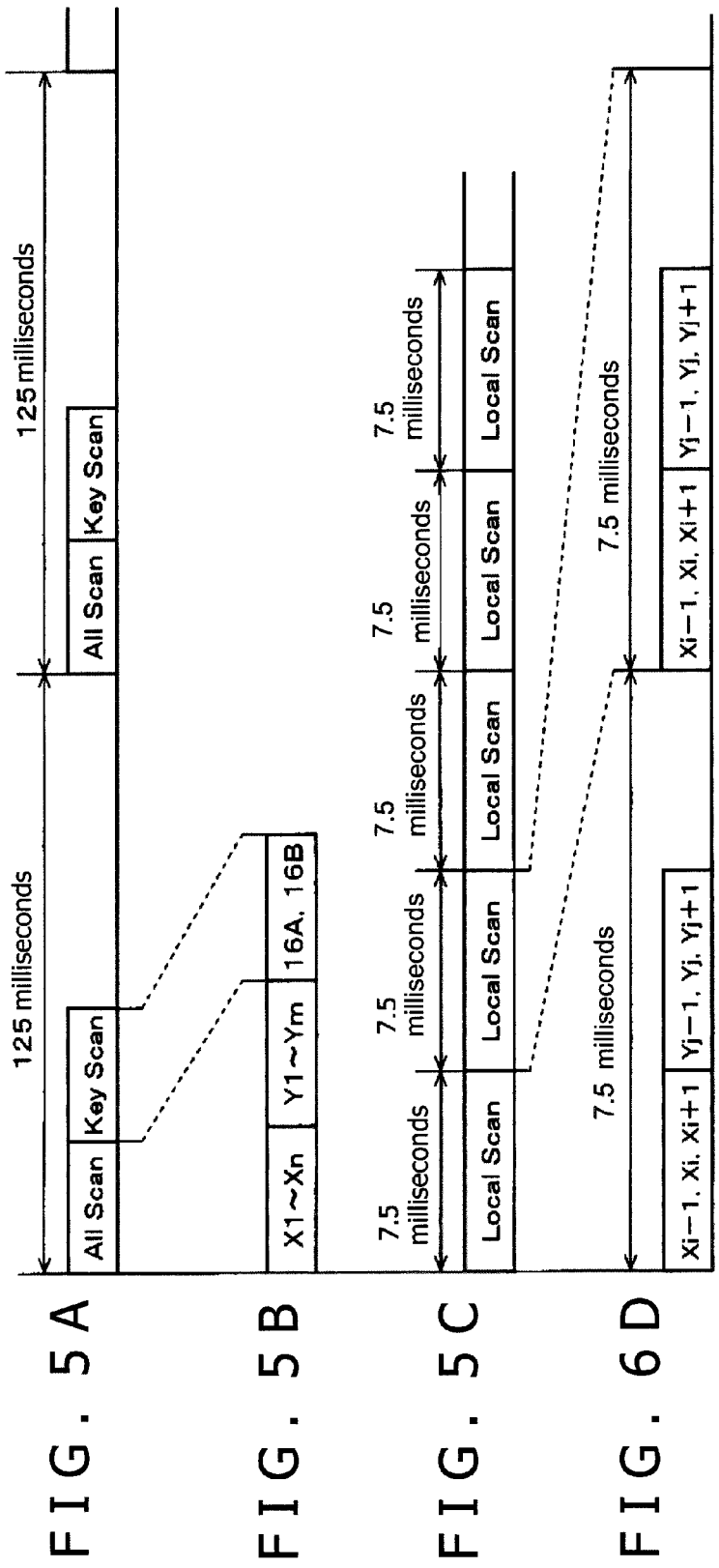
FIGS. 5A to 5D are diagrams indicating a timing chart for explaining the processing operation example of part of the electronic apparatus according to the first embodiment of this disclosure.
Figure 6:
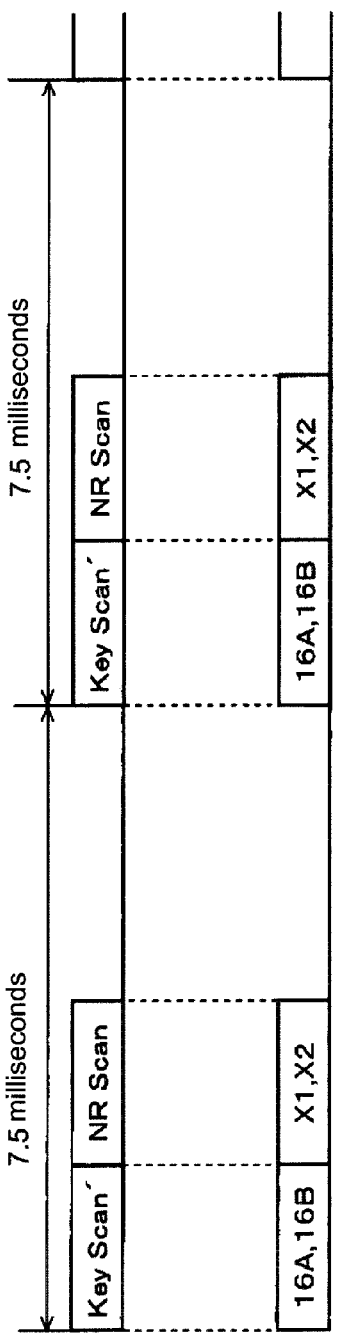
FIGS. 6A and 6B are diagrams indicating a timing chart for explaining the processing operation example of part of the electronic apparatus according to the first embodiment of this disclosure.

One example of the flow of scan control operation carried out by the processing control unit 105 of the electronic apparatus 10 of this first embodiment will be described with reference to a flowchart of FIG. 4.

First, as the state in which the position indicator 20 as an indicating object is being detected by neither the display-corresponding sensor unit 13 nor the key-corresponding sensor unit 16, the processing control unit 105 carries out the all-scan about the display-corresponding sensor unit 13 and carries out a scan at the speed of the all-scan about the key-corresponding sensor unit 16 (step S1).

An example of the scan operation in this step S1 is indicated in FIGS. 5A and 5B. Specifically, the processing control unit 105 carries out the scan of all loop coils 15X and 15Y of the display-corresponding sensor unit 13 (all-scan) and carries out the scan of the two loop coils 16A and 16B of the key-corresponding sensor unit 16 every 125 milliseconds for example.

In this case, in FIG. 5A, a period of "All Scan" is a period during which the all-scan of the display-corresponding sensor unit 13 is carried out. In this period, as indicated in FIG. 5B, the processing control unit 105 sequentially scans all loop coils X1 to X40 of the X-axis direction loop coil group 15X (above-described transmission and reception and coordinate detection processing) and then sequentially scans all loop coils Y1 to Y20 of the Y-axis direction loop coil group 15Y. Furthermore, in a period of "Key Scan" immediately after this period of "All Scan," the processing control unit 105 scans the two loop coils 16A and 16B of the key-corresponding sensor unit 16 as indicated in FIG. 5B. In the step S1, the period of "All Scan" and the period of "Key Scan" are repeated every 125 milliseconds.

Next, the processing control unit 105 determines whether or not the position indicator 20 as an example of the indicating object is detected in the display-corresponding sensor unit 13 in the scan of the step S1 (step S2). When determining in this step S2 that the pen is detected in the display-corresponding sensor unit 13, the processing control unit 105 carries out, regarding the display-corresponding sensor unit 13, the local scan of scanning only loop coils near the coordinates of the position indicated by the detected position indicator 20 and makes a pause of the scan of the key-corresponding sensor unit 16 (step S3).

An operation example of the local scan in this step S3 is depicted in FIGS. 5C and 5D. Specifically, only regarding the display-corresponding sensor unit 13, the processing control unit 105 carries out the local scan at a speed higher than the speed in the all-scan, specifically every 7.5 milliseconds for example (see "Local Scan" in FIG. 5C).

In this local scan, if the coordinate position of the position indicator 20 in the display-corresponding sensor unit 13 is (Xi, Yj), the processing control unit 105 scans only three loop coils centered at the coordinate position regarding each of the X-axis direction and the Y-axis direction, i.e., the loop coils Xi–1, Xi, Xi+1, Yj–1, Yj, and Yj+1 (see FIG. 5D), as described above.

Subsequently to the step S3, the processing control unit 105 determines whether or not the position indicator 20 is separated to the state in which the position indicator 20 is not detected in the display-corresponding sensor unit 13 (step S4). When determining that the position indicator 20 is not separated, the processing control unit 105 returns the processing to the step S3 to continue the local scan. When determining in the step S4 that the position indicator 20 is separated to the state in which the position indicator 20 is not detected in the display-corresponding sensor unit 13, the processing control unit 105 returns the processing to the step S1 to repeat the processing of this step S1 and the subsequent steps.

When determining in the step S2 that the position indicator 20 is not detected in the display-corresponding sensor unit 13, the processing control unit 105 determines whether or not the position indicator 20 is detected in the key-corresponding sensor unit 16 (step S5). When determining that the position indicator 20 is not detected also in the key-corresponding sensor unit 16, the processing control unit 105 returns the processing to the step S1 to repeat the processing of this step S1 and the subsequent steps.

When determining in the step S5 that the position indicator 20 is detected in the key-corresponding sensor unit 16, the processing control unit 105 carries out the above-described near-area scan at the speed of the local scan regarding the display-corresponding sensor unit 13 and carries out a scan at the speed of the local scan regarding the key-corresponding sensor unit 16 (step S6).

An example of the scan operation in this step S6 is depicted in FIGS. 6A and 6B. Specifically, every 7.5 milliseconds, which is the speed of the local scan, the processing control unit 105 carries out the scan of the two loop coils 16A and 16B (see FIG. 6B) of the key-corresponding sensor unit 16 in a period of "Key Scan" depicted in FIG. 6A. In addition, regarding the display-corresponding sensor unit 13, the processing control unit 105 carries out the near-area scan of scanning only one or plural loop coils close to the key-corresponding sensor unit 16, specifically two X-axis direction loop coils X1 and X2 in this example (see FIG. 6B), in a period of "NR Scan" depicted in FIG. 6A.

Subsequently to this step S6, the processing control unit 105 determines whether or not the position indicator 20 is detected in the display-corresponding sensor unit 13 (step S7). Specifically, the processing control unit 105 determines whether or not the position indicator 20 has moved from the key-corresponding sensor unit 16 to the display-corresponding sensor unit 13. At this time, because the near-area scan is being carried out in the display-corresponding sensor unit 13, the processing control unit 105 can surely detect the movement of the position indicator 20 from the key-corresponding sensor unit 16 to the display-corresponding sensor unit 13 even if the speed of the movement is high.

When determining in the step S7 that the position indicator 20 is not detected in the display-corresponding sensor unit 13, the processing control unit 105 determines whether or not the position indicator 20 is separated from the key-corresponding sensor unit 16 (step S8). When determining in this step S8 that the position indicator 20 is not separated from the key-corresponding sensor unit 16, the processing control unit 105 returns the processing to the step S6 to repeat the processing of this step S6 and the subsequent steps. When determining in the step S8 that the position indicator 20 is separated from the key-corresponding sensor unit 16, the processing control unit 105 returns the processing to the step S1 to repeat the processing of this step S1 and the subsequent steps.

When determining in the step S7 that the position indicator 20 is detected in the display-corresponding sensor unit 13, the processing control unit 105 returns the processing to the step S3 to repeat the processing of this step S3 and the subsequent steps.

Effects of First Embodiment

As described above, according to the above-described first embodiment, when an indicating object is being detected in the key-corresponding sensor unit 16, the near-area scan of scanning only loop coils in the area close to the key-corresponding sensor unit 16 at the local scan speed is carried out in the display-corresponding sensor unit 13. Thus, when the position indicator 20 as the indicating object is moved from the key-corresponding sensor unit 16 to the display-corresponding sensor unit 13, the indicating object can be detected in the display-corresponding sensor unit 13 with a favorable following characteristic even if the speed of the movement is high.

Furthermore, when the indicating object is detected in the display-corresponding sensor unit 13, a pause is made in the scan in the key-corresponding sensor unit 16. Thus, even if a user locates the indicating object in the indication input region of the key-corresponding sensor unit 16 by mistake due to carelessness or the like when operating the indicating object over the display-corresponding sensor unit 13, the indicating object is not detected in the key-corresponding sensor unit 16 if the time for which the indicating object is located is a short time, enabling prevention of a malfunction.

Modification Examples of First Embodiment

In the above-described first embodiment, when an indicating object is being detected in the key-corresponding sensor unit 16, the near-area scan of scanning only loop coils in the area close to the key-corresponding sensor unit 16 at the local scan speed is carried out in the display-corresponding sensor unit 13. However, when the indicating object is being detected in the key-corresponding sensor unit 16, the near-area scan of scanning only loop coils in the area close to the key-corresponding sensor unit 16 at the local scan speed and the all-scan may be carried out in a time-sharing manner in the display-corresponding sensor unit 13. Furthermore, in the case of carrying out the near-area scan and the all-scan in a time-sharing manner, the near-area scan and the all-scan may be alternately carried out at equal frequencies. Alternatively, the near-area scan may be mainly carried out and the all-scan may be occasionally carried out.

The number of key-corresponding indication input regions in the key-corresponding sensor unit 16 is two in the above-described example. However, it is obvious that the number may be one or may be three or more. Furthermore, in the above-described example, the configuration including one sensor unit 16 common to the two key-corresponding indication input regions 14A and 14B is employed. However, a configuration may be employed in which two sensor units each corresponding to a respective one of the two key-corresponding indication input regions 14A and 14B are provided. This also applies to the case in which three or more key-corresponding indication input regions are set.

In the above-described embodiment, when an indicating object is detected in the display-corresponding sensor unit 13, a pause is made in the scan in the key-corresponding sensor unit 16 irrespective of the detected position thereof. However, a pause may be made in the scan in the key-corresponding sensor unit 16 when the indicating object is detected in the near area to the key-corresponding sensor unit 16 in the display-corresponding sensor unit 13.

Furthermore, when the case of the movement of the indicating object from the display-corresponding sensor unit 13 to the key-corresponding sensor unit 16 is taken into consideration, a scan at the all-scan speed may be carried out in the key-corresponding sensor unit 16 without making a pause in the scan of the key-corresponding sensor unit 16.

Moreover, the scan in the key-corresponding sensor unit 16 (scan speed may be either the all-scan speed or the local-scan speed) in a pause may be started at the timing when the movement of the indicating object in a direction toward the key-corresponding sensor unit 16 in the display-corresponding sensor unit 13 is detected and when the indicating object is detected in the near area to the key-corresponding sensor unit 16 in the indication input region of the display-corresponding sensor unit 13.

Second Embodiment

A second embodiment is a case in which an electronic apparatus includes two display screens and a sensor unit is disposed on the lower side (back side) of each display screen in an overlapping manner.

Figure 7:
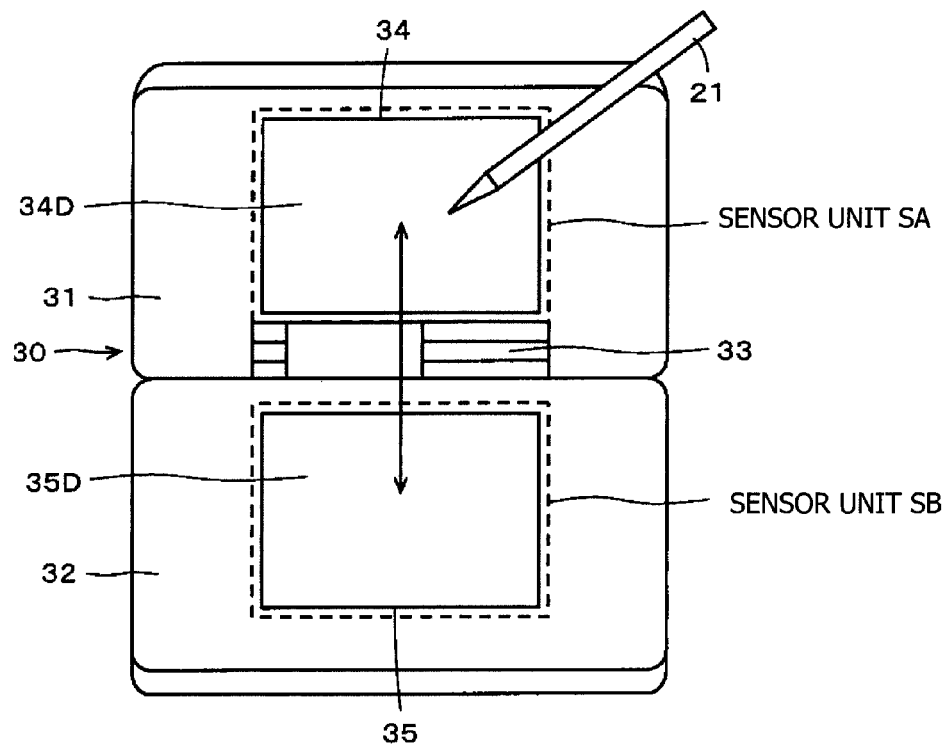
FIG. 7 is a diagram for explaining a configuration example of an electronic apparatus according to a second embodiment of this disclosure.

FIG. 7 is a diagram for explaining the outline of an electronic apparatus 30 of this second embodiment. This electronic apparatus 30 has a configuration in which two casings 31 and 32 each having a rectangular flattened shape are pivotally joined to each other by a joining part 33. In the casings 31 and 32, display devices 34 and 35 each formed of, e.g., an LCD are provided and sensor units SA and SB are provided to overlap with display screens 34D and 35D of the display devices 34 and 35.

This electronic apparatus 30 can be turned to an object like one elongated casing when the two casings 31 and 32 are made to pivot around the joining part 33 and are closed to overlap with each other. In addition, when the electronic apparatus 30 is opened, with the joining part 33 being the center of the pivot, the display screens 34D and 35D provided in the surfaces opposed to each other when the casings 31 and 32 are made to overlap with each other become viewable as depicted in FIG. 7.

The sensor units SA and SB each have a configuration of a sensor unit of the same electromagnetic induction system as the display-corresponding sensor unit 13 of the above-described first embodiment, and each include plural loop coils X1 to Xn of the X-axis direction and loop coils Y1 to Ym of the Y-axis direction although not depicted in the diagram.

Figure 8:
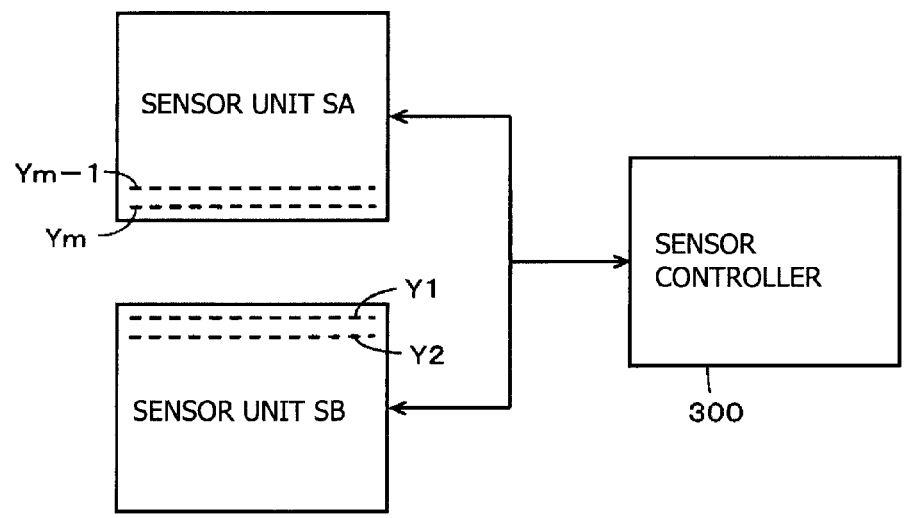
FIG. 8 is a diagram for explaining part of the electronic apparatus according to the second embodiment of this disclosure.

Furthermore, in this second electronic apparatus 30, the sensor unit SA and the sensor unit SB are connected to a sensor controller 300 as depicted in FIG. 8. This sensor controller 300 forms a control circuit of the electronic apparatus 30.

As the sensor controller 300, one having a configuration similar to that of the sensor controller 100 depicted in FIG. 3 in the above-described first embodiment can be employed. However, in this second embodiment, the sensor unit SA having a configuration similar to that of the display-corresponding sensor unit 13 is connected instead of the display-corresponding sensor unit 13 of the first embodiment. In addition, the sensor unit SB having a configuration similar to that of the display-corresponding sensor unit 13 is connected instead of the key-corresponding sensor unit 16. Therefore, as a circuit for the sensor unit SB, a selection circuit similar to the selection circuit 101D is provided instead of the selection circuit 101K and is controlled by a processing control unit formed of a microcomputer similarly to the selection circuit 101D.

That is, the sensor controller 300 controls scan operation about the plural loop coils X1 to Xn and Y1 to Ym of the sensor unit SA and controls scan operation about the plural loop coils X1 to Xn and Y1 to Ym of the sensor unit SB.

Furthermore, from the result of the scan in the sensor unit SA, the sensor controller 300 executes detection processing of a position indicated by an indicating object, specifically a pen-type position indicator 21 (having the same configuration as the position indicator 20) corresponding to the electromagnetic induction system in this example, on the indication input surface (indication input region) of the sensor unit SA corresponding to the display screen 34D. In addition, from the result of the scan in the sensor unit SB, the sensor controller 300 executes detection processing of a position indicated by the position indicator 21 on the indication input surface (indication input region) of the sensor unit SB corresponding to the display screen 35D.

When the position indicator 21 is being detected in neither the indication input surface of the sensor unit SA corresponding to the display screen 34D nor the indication input surface of the sensor unit SB corresponding to the display screen 35D, the sensor controller 300 carries out control to make the all-scan of sequentially scanning loop coils at a first speed, specifically, e.g., at time intervals of 125 milliseconds, in the sensor units SA and SB.

When the position indicator 21 is detected in the indication input surface of the sensor unit SA corresponding to the display screen 34D, the sensor controller 300 carries out, for the sensor unit SA, control to make the local scan of sequentially scanning only plural loop coils near the detected position of the position indicator 21 at a second speed higher than the first speed, specifically every 7.5 milliseconds for example. Similarly to the first embodiment, in this local scan, for example when the position indicator 21 is detected at the position of the intersection of the loop coil Xi and the loop coil Yj (i and j are integers), plural loop coils centered at the loop coil Xi, e.g., three loop coils Xi−1, Xi, and Xi+1, and plural loop coils centered at the loop coil Yj, e.g., three loop coils Yj−1, Yj, and Yj+1, are sequentially scanned.

Also when the position indicator 21 is detected in the indication input surface of the sensor unit SB corresponding to the display screen 35D, the sensor controller 300 carries out control to make the local scan similar to that of the sensor unit SA.

Furthermore, in this second embodiment, when the position indicator 21 is detected in one of the sensor unit SA and the sensor unit SB, the sensor controller 300 controls the scan of the other as follows. Specifically, the sensor controller 300 monitors the detected position of the position indicator 21 in the one of the sensor unit SA and the sensor unit SB, e.g., the sensor unit SA. When the detected position is in the near area to the other sensor unit SB, the sensor controller 300 carries out the local scan in the near area to the one sensor unit SA, i.e., the near-area scan, in the other sensor unit SB. When the detected position of the position indicator 21 is not in the near area, the sensor controller 300 carries out the all-scan in the other sensor unit SB.

In this case, the near area in the case of determining whether or not the detected position of the position indicator is in the near area to the other sensor unit is the area occupied by one or plural, e.g., two or three, loop coils close to the other sensor unit.

Also in this second embodiment, the near-area scan carried out by the sensor unit SA or the sensor unit SB is made with one or plural loop coils close to the other sensor unit. In the example of FIG. 7, the sensor unit SA and the sensor unit SB are adjacent to each other in the Y-axis direction. Thus, as depicted in FIG. 8, in the sensor unit SA, one or plural loop coils close to the sensor unit SB, specifically two Y-axis direction loop coils Ym and Ym−1 in this example, are the target of the near-area scan. In the sensor unit SB, one or plural loop coils close to the sensor unit SA, specifically two Y-axis direction loop coils Y1 and Y2 in this example, are the target of the near-area scan.

As above, in this second embodiment, the near-area scan is carried out in the sensor units SA and SB when the position indicator 21 is detected in the near area to the self-sensor unit in the indication input surface of the other sensor unit, which is not the self-sensor unit. Therefore, even when the position indicator 21 moves at high speed between the sensor unit SA and the sensor unit SB, the position indicator 21 can be detected in such a manner as to follow the movement.

Figure 9:
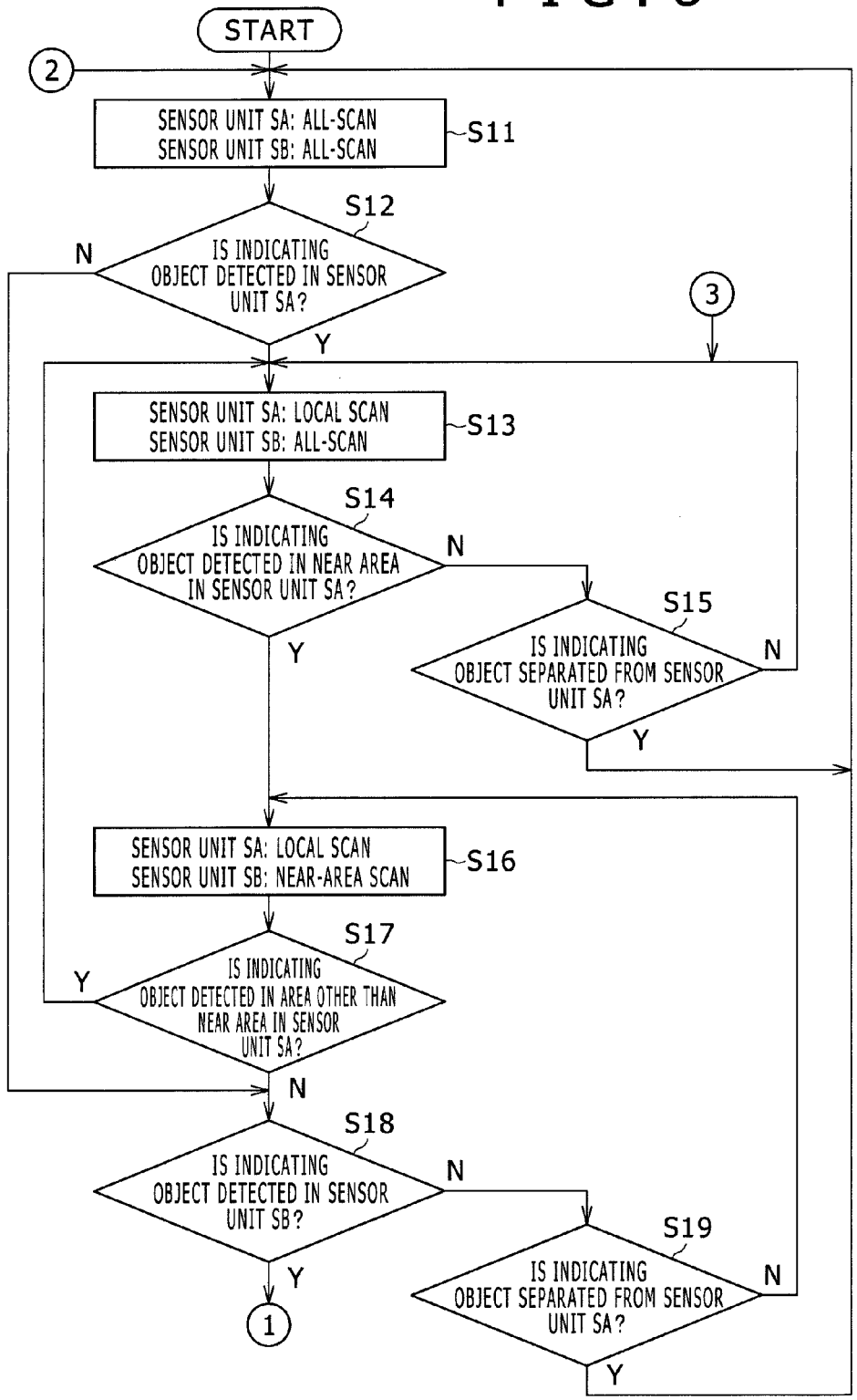
FIG. 9 is a diagram indicating part of a flowchart for explaining a processing operation example of the electronic apparatus according to the second embodiment of this disclosure.

Next, one example of the flow of the scan control operation carried out by the sensor controller 300 of the electronic apparatus 30 of this second embodiment will be described with reference to a flowchart of FIGS. 9 and 10. Although the processing of each step in the flowchart is executed by the processing control unit of the sensor controller 300, here the processing will be described as processing executed by the sensor controller 300 for convenience. Furthermore, in the following description, the indicating object is the position indicator 21 in this example.

First, as the state in which the indicating object is being detected by neither the sensor unit SA nor SB, the sensor controller 300 carries out the all-scan at a repetition cycle of, e.g., 125 milliseconds regarding the sensor units SA and SB (step S11).

Next, the sensor controller 300 determines whether or not the indicating object is detected in the sensor unit SA in the scan of the step S11 (step S12). When determining in this step S12 that the indicating object is detected in the sensor unit SA, the sensor controller 300 carries out, for the sensor unit SA, the local scan of scanning only loop coils near the coordinates of the position indicated by the detected indicating object every 7.5 milliseconds for example, and keeps the all-scan for the other sensor unit SB (step S13).

Subsequently to this step S13, the sensor controller 300 determines whether or not the position coordinates of the indicating object in the sensor unit SA fall within the near area to the sensor unit SB (step S14). When determining in this step S14 that the position coordinates of the indicating object in the sensor unit SA do not fall within the near area to the sensor unit SB, the sensor controller 300 determines whether or not the indicating object is separated from the indication input surface of the sensor unit SA and has become incapable of being detected (step S15).

When determining in this step S15 that the indicating object is not separated from the indication input surface of the sensor unit SA and has not become incapable of being detected, the sensor controller 300 returns the processing to the step S13 to repeat the processing of this step S13 and the subsequent steps. When determining in the step S15 that the indicating object is separated from the indication input surface of the sensor unit SA and has become incapable of being detected, the sensor controller 300 returns the processing to the step S11 to repeat the processing of this step S11 and the subsequent steps.

When determining in the step S14 that the position coordinates of the indicating object in the sensor unit SA fall within the near area to the sensor unit SB, the sensor controller 300 continues the local scan regarding the sensor unit SA but changes the scan of the sensor unit SB from the all-scan to the near-area scan at the same speed as the local scan (step S16).

Next, the sensor controller 300 determines whether or not the sensor unit SA detects the indicating object in the area other than the near area (step S17). When determining that the sensor unit SA detects the indicating object in the area other than the near area, the sensor controller 300 returns the processing to the step S13 to carry out the local scan regarding the sensor unit SA and make a change to the state in which the all-scan is carried out regarding the other sensor unit SB.

When determining in the step S17 that the sensor unit SA is not detecting the indicating object in the area other than the near area, the sensor controller 300 determines whether or not the present state is the state in which not the sensor unit SA but the sensor unit SB detects the indicating object (step S18). When determining in this step S18 that the present state is not the state in which not the sensor unit SA but the sensor unit SB detects the indicating object, the sensor controller 300 determines whether or not the indicating object is separated from the indication input surface of the sensor unit SA and has become incapable of being detected (step S19).

When determining in this step S19 that the indicating object is not separated from the indication input surface of the sensor unit SA and has not become incapable of being detected, the sensor controller 300 returns the processing to the step S16 to repeat the processing of this step S16 and the subsequent steps. When determining in the step S19 that the indicating object is separated from the indication input surface of the sensor unit SA and has become incapable of being detected, the sensor controller 300 returns the processing to the step S11 to repeat the processing of this step S11 and the subsequent steps.

Figure 10:
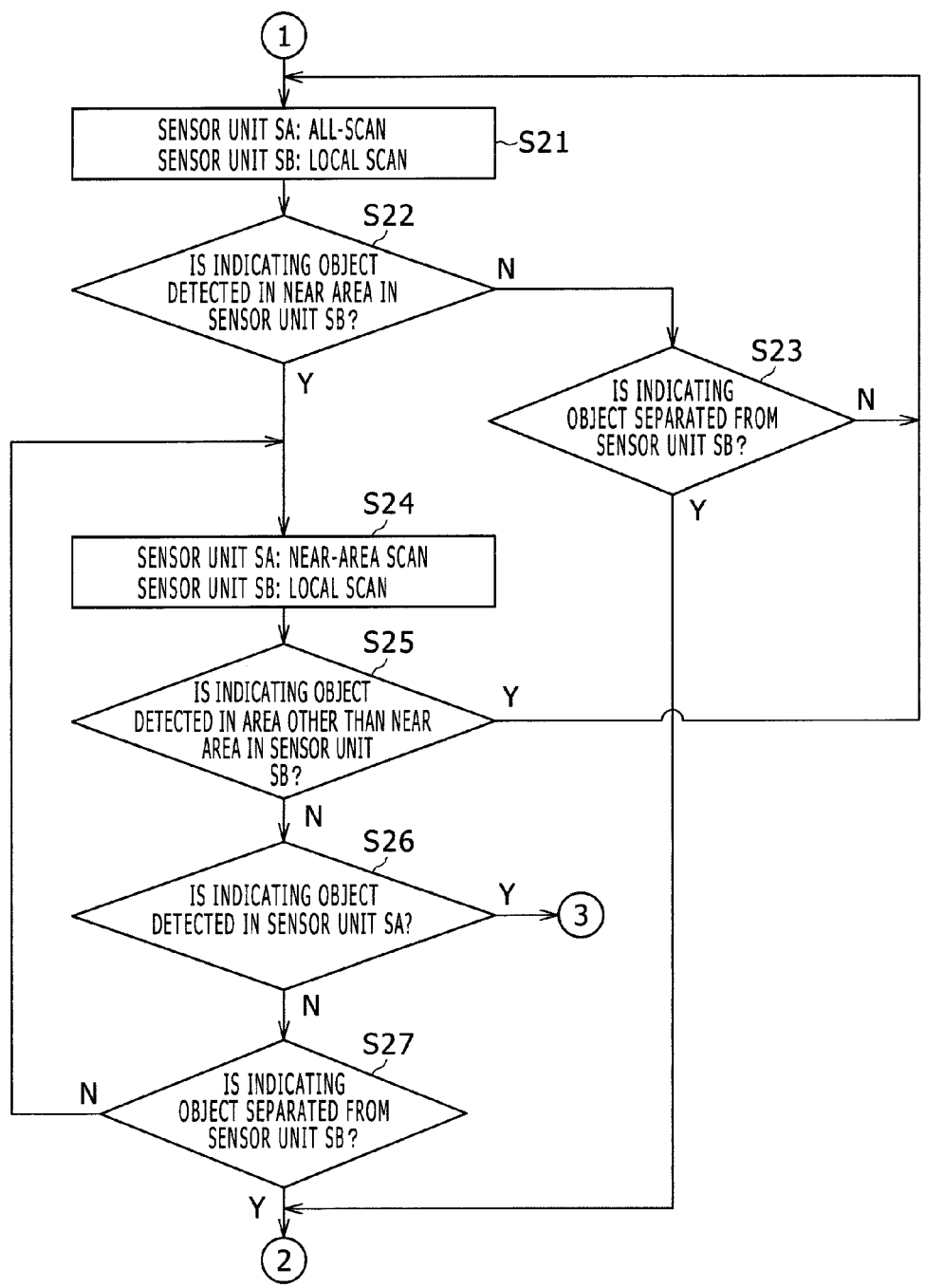
FIG. 10 is another diagram indicating part of the flowchart for explaining the processing operation example of part of the electronic apparatus according to the second embodiment of this disclosure.

When determining in the step S18 that the present state is the state in which not the sensor unit SA but the sensor unit SB detects the indicating object, the sensor controller 300 sets the state in which the all-scan is carried out regarding the sensor unit SA and carries out, regarding the sensor unit SB, the local scan of scanning only loop coils near the coordinates of the position indicated by the detected indicating object every 7.5 milliseconds for example (step S21 in FIG. 10).

Subsequently to this step S21, the sensor controller 300 determines whether or not the position coordinates of the indicating object in the sensor unit SB fall within the near area to the sensor unit SA (step S22). When determining in this step S22 that the position coordinates of the indicating object in the sensor unit SB do not fall within the near area to the sensor unit SA, the sensor controller 300 determines whether or not the indicating object is separated from the indication input surface of the sensor unit SB and has become incapable of being detected (step S23).

When determining in this step S23 that the indicating object is not separated from the indication input surface of the sensor unit SB and has not become incapable of being detected, the sensor controller 300 returns the processing to the step S21 to repeat the processing of this step S21 and the subsequent steps. When determining in the step S23 that the indicating object is separated from the indication input surface of the sensor unit SB and has become incapable of being detected, the sensor controller 300 returns the processing to the step S11 to repeat the processing of this step S11 and the subsequent steps.

When determining in the step S22 that the position coordinates of the indicating object in the sensor unit SB fall within the near area to the sensor unit SA, the sensor controller 300 changes the scan of the sensor unit SA from the all-scan to the near-area scan at the same speed as the local scan and continues the local scan regarding the sensor unit SB (step S24).

Next, the sensor controller 300 determines whether or not the sensor unit SB detects the indicating object in the area other than the near area (step S25). When determining that the sensor unit SB detects the indicating object in the area other than the near area, the sensor controller 300 returns the processing to the step S21 to make a change to the state in which the all-scan is carried out regarding the sensor unit SA and continue the local scan regarding the sensor unit SB.

When determining in the step S25 that the sensor unit SB is not detecting the indicating object in the area other than the near area, the sensor controller 300 determines whether or not the present state is the state in which not the sensor unit SB but the sensor unit SA detects the indicating object (step S26). When determining in this step S26 that the present state is the state in which not the sensor unit SB but the sensor unit SA detects the indicating object, the sensor controller 300 returns the processing to the step S13 to repeat the processing of this step S13 and the subsequent steps.

When determining in this step S26 that the present state is not the state in which not the sensor unit SB but the sensor unit SA detects the indicating object, the sensor controller 300 determines whether or not the indicating object is separated from the indication input surface of the sensor unit SB and has become incapable of being detected (step S27).

When determining in this step S27 that the indicating object is not separated from the indication input surface of the sensor unit SB, the sensor controller 300 returns the processing to the step S24 to repeat the processing of this step S24 and the subsequent steps. When determining in the step S27 that the indicating object is separated from the indication input surface of the sensor unit SB and has become incapable of being detected, the sensor controller 300 returns the processing to the step S11 to repeat the processing of this step S11 and the subsequent steps.

Effects of Second Embodiment

As above, in this second embodiment, in the case in which an electronic apparatus has two display screens and includes the sensor units SA and SB of the same kind of detection system each overlapping with a respective one of the display screens, the near-area scan is carried out in one of the sensor units SA and SB when the indicating object is detected in the near area to the one sensor unit in the indication input surface of the other. Thus, even when the indicating object moves at high speed from the other to the one of the sensor unit SA and the sensor unit SB, the one sensor unit can surely detect the indicating object in such a manner as to follow the movement.

Therefore, according to the electronic apparatus of the second embodiment, the indicating object can be moved by using the two display screens as if they were one display screen. This allows the electronic apparatus of the second embodiment to move the indicating object with a favorable following characteristic in the indication input surfaces of the sensor units corresponding to the two display screens. Thus, processing by use of the indicating object in various applications, such as file exchange between the two screens and a game with use of the two screens, can be favorably realized.

Modification Examples of Second Embodiment

In the above-described second embodiment, the near-area scan is carried out in one sensor unit only when the indicating object is detected in the near area to the one sensor unit in the indication input surface of the other sensor unit. However, when the indicating object is detected in one sensor unit, the near-area scan may be carried out in the other sensor unit irrespective of the detected position of the indicating object.

Furthermore, in the above-described second embodiment, when the indicating object is being detected in the near area in one sensor unit, the near-area scan of scanning only loop coils in the area close to the one sensor unit at the local scan speed is carried out in the other sensor unit. However, when the indicating object is being detected in the near area in one sensor unit, the near-area scan of scanning only loop coils in the area close to the one sensor unit at the local scan speed and the all-scan may be carried out in a time-sharing manner in the other sensor unit. Furthermore, in the case of carrying out the near-area scan and the all-scan in a time-sharing manner, the near-area scan and the all-scan may be alternately carried out at equal frequencies. Alternatively, the near-area scan may be mainly carried out and the all-scan may be occasionally carried out.

Moreover, when the indicating object is being detected in one sensor unit and the local scan is being carried out therein and the detected position of the indicating object is not in the near area to the other sensor unit, the all-scan is carried out in the other sensor unit. However, a pause may be made in the scan of the other sensor unit.

The electronic apparatus of the above-described second embodiment is an apparatus that has two display screens and includes two sensor units disposed to overlap with these two display screens. However, the electronic apparatus of this disclosure may be an apparatus that has three or more display screens and includes three or more sensor units disposed to overlap with these display screens.

Third Embodiment

The electronic apparatuses of the above-described embodiments correspond to the cases in which the electronic apparatus includes plural sensor units and control including scan control is carried out on these plural sensor units by one common sensor controller. An electronic apparatus of a third embodiment corresponds to the case in which the self-apparatus has only one sensor unit but enables detection of the movement of an indicating object between two sensor units by communicating with another electronic apparatus.

In this third embodiment, detection processing of the movement of an indicating object between two sensor units according to this disclosure is applied to the detection of the movement of the indicating object in the case of implementing an application in which two electronic apparatuses collaborate with each other. Specifically, two electronic apparatuses need to be disposed close to each other and it is necessary to enable detection of the indicating object with following of the high-speed movement of the indicating object between the sensor units of the two electronic apparatuses disposed close to each other. This disclosure is applied to scan control over the sensor units of the electronic apparatuses for this purpose.

First, prior to description of the electronic apparatus of the third embodiment, the application in which two electronic apparatuses collaborate with each other will be described. In the following description, the application in which two electronic apparatuses collaborate with each other will be described as an example of the case in which the electronic apparatus is a high-function mobile phone terminal called a smartphone for example. In the application of this example, while communication is carried out between plural electronic apparatuses, for example an object such as a file displayed on a display screen of one electronic apparatus is dragged by using an indicating object such as a pen and is moved to a display screen of the other electronic apparatus to thereby allow the dragged object to be copied or moved from the one electronic apparatus to the other electronic apparatus.

Figure 11:
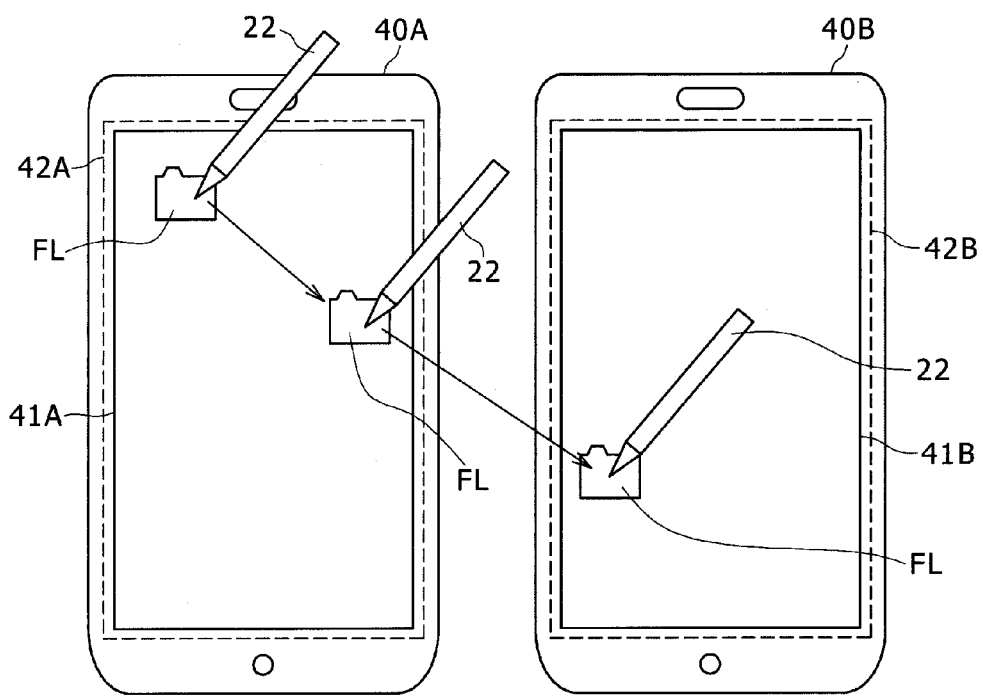
FIG. 11 is a diagram for explaining a configuration example of an electronic apparatus according to a third embodiment of this disclosure.

To apply the application of this example, first, two mobile phone terminals 40A and 40B as an example of an electronic apparatus are put side by side, with display screens 41A and 41B thereof set close to each other, as depicted in FIG. 11. In this case, the two mobile phone terminals 40A and 40B include sensor units 42A and 42B (see dotted lines in FIG. 11) of the same electromagnetic induction system as, e.g., the above-described display-corresponding sensor unit 13, disposed to overlap with the display screens 41A and 41B. In this example, as depicted in FIG. 11, the mobile phone terminals 40A and 40B each having a substantially rectangular parallelepiped shape are juxtaposed side by side adjacent to each other, with the longitudinal directions thereof set parallel to each other, and the display screens 41A and 41B and hence the sensor units 42A and 42B are disposed close to each other in a direction along the surface direction of their indication input surfaces.

Then, a user activates the relevant application of the two mobile phone terminals 40A and 40B and causes an icon of an object to be copied or moved to be displayed on the display screen of one mobile phone terminal. Subsequently, the user carries out operation of dragging the icon by an indicating object, specifically a pen-type position indicator 22 (having the same configuration as the above-described pen 20) of the electromagnetic induction system in this example, and carries out operation of moving the icon to the display screen of the other mobile phone terminal and dropping the icon of this object on the display screen of the other mobile phone terminal.

In the example of FIG. 11, the user drags a predetermined file FL (icon) as an example of the object displayed on the display screen 41A of the mobile phone terminal 40A through operation of long-pressing the file FL by the position indicator 22, or pressing down a switch provided in the position indicator 22, or the like. Then, with the drag kept, the user moves the file FL on the display screen 41A by the position indicator 22 to thereby move the file FL on the display screen 41A as depicted in FIG. 11. Moreover, the user continues the movement to the display screen 41B of the adjacent mobile phone terminal 40B. Then, in the mobile phone terminal 40B, the user carries out a drop operation of the file FL by carrying out operation of separating the position indicator 22 from the display screen 41B, or releasing the pressing-down of the switch, or the like. Thereby, the user copies or moves the file FL stored in the mobile phone terminal 40A to the mobile phone terminal 40B.

In this case, control over the sensor unit 42A of the mobile phone terminal 40A and the sensor unit 42B of the mobile phone terminal 40B by the sensor controller is carried out similarly to the control over the two sensor units SA and SB of the above-described second embodiment. This allows the movement of the position indicator 22 to be transmitted between the two mobile phone terminals with a favorable following characteristic, enabling displaying of the smooth movement of the file FL from the display screen 41A to the display screen 41B.

However, this third embodiment has a configuration in which the sensor unit 42A and the sensor unit 42B are each controlled by an independent sensor controller. Therefore, when this configuration is used as it is, it is impossible to carry out control similar to the control by the common sensor controller in the second embodiment. Therefore, in this third embodiment, when the relevant application is used, communication is carried out between two electronic apparatuses and the position detection coordinates of the position indicator 22 are transmitted and received between the sensor controllers so that the movement of the position indicator 22 between the two sensor units 42A and 42B can be detected with a favorable following characteristic similarly to the above-described second embodiment.

A further description will be made below about a configuration example and a processing operation example of the mobile phone terminals as an example of the electronic apparatus of the third embodiment to implement the above.

Figure 12:
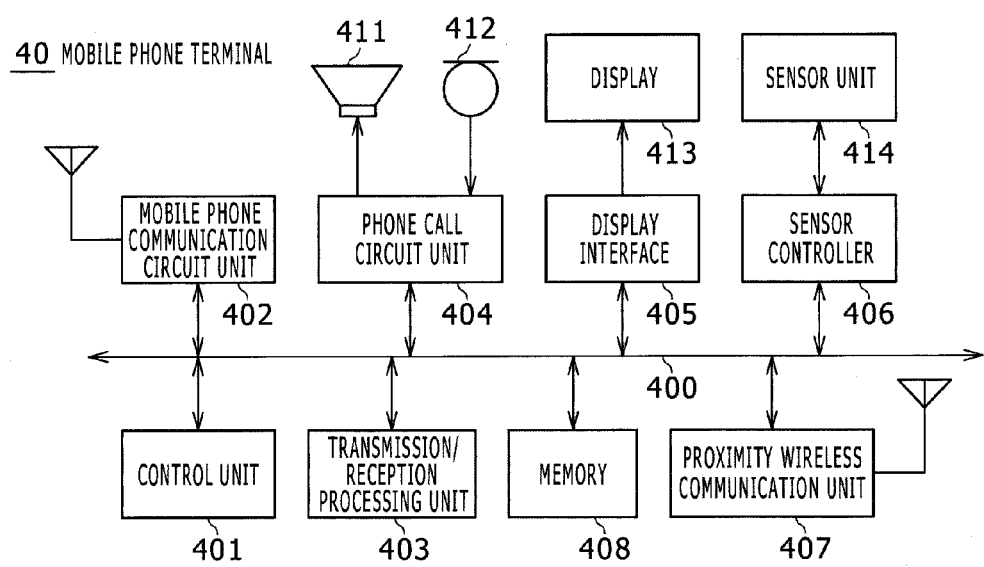
FIG. 12 is a block diagram indicating a configuration example of the electronic apparatus according to the third embodiment of this disclosure.

Hardware Configuration Example of Mobile Phone Terminal as Example of Electronic Apparatus FIG. 12 is a diagram depicting a hardware configuration example of a mobile phone terminal 40 as an example of the electronic apparatus of this third embodiment. The mobile phone terminals 40A and 40B have completely the same configuration as the mobile phone terminal 40 depicted in this FIG. 12. In the following description, the mobile phone terminals will be represented as the mobile phone terminal 40 when there is no need to discriminate the mobile phone terminals.

As depicted in FIG. 12, in the mobile phone terminal 40 of this example, a control unit 401 formed of a microcomputer is connected to each of a mobile phone communication circuit unit 402, a transmission/reception processing unit 403, a phone call circuit unit 404, a display interface 405, a sensor controller 406, a proximity wireless communication unit 407, and a memory 408 through a system bus 400.

The control unit 401 is a unit for controlling phone functions of the mobile phone terminal 40 and other various kinds of control processing. In this example, the control unit 401 executes various application programs stored in the memory 408 and controls execution of, e.g., application processing of copy or movement between two mobile phone terminals 40, which will be described later.

The mobile phone communication circuit unit 402 is a unit for connecting to an other-end terminal through a base station of a mobile phone network and connecting to the Internet. The transmission/reception processing unit 403 analyzes information received through the mobile phone communication circuit unit 402 and transfers the information to the respective necessary units through the system bus 400 in accordance with control by the control unit 401. In addition, the transmission/reception processing unit 403 generates transmission information to be transmitted to a base station and transfers the transmission information to the mobile phone communication circuit unit 402. Furthermore, the transmission/reception processing unit 403 also executes processing of information transmitted and received through the proximity wireless communication unit 407 in this embodiment.

The phone call circuit unit 404 executes processing of phone speech and is connected to a speaker 411 forming a telephone receiver and a microphone 412 forming a telephone transmitter.

To the display interface 405, a display 413 that is formed of, e.g., an LCD and has the display screen 41A is connected. A sensor unit 414 is provided in an overlapping manner over the display screen of the display 413 and this sensor unit 414 is connected to the sensor controller 406. This sensor unit 414 will be represented as the sensor unit 42A in the mobile phone terminal 40A and will be represented as the sensor unit 42B in the mobile phone terminal 40B.

The sensor controller 406 is a unit having a configuration similar to that of the above-described sensor controller 300 and so forth. The sensor controller 406 controls the scan of the sensor unit 414 and detects a position indicated by the position indicator 22 by a user through the sensor unit 414. However, the sensor controller 406 can detect only the position of the position indicator 22 in the sensor unit 414 of the self-terminal but can implement functions similar to those of the above-described sensor controller 300 by using the result of position detection of the position indicator 22 in the sensor unit 414 of another mobile phone terminal from the proximity wireless communication unit 407.

Furthermore, in this third embodiment, operation input by the position indicator 22 can be made through the sensor unit 414 and a character input key operation screen, a setting acceptance screen, and so forth are displayed on the display screen of the display 413 in accordance with control by the control unit 401. The user can make predetermined operation input by performing predetermined behavior such as touch operation with the position indicator 22, drag operation, drop operation, and slide movement on this sensor unit 414.

The sensor controller 406 transmits an operation detection signal according to operation indication input by the user through the sensor unit 414 to the control unit 401 through the system bus 400. The control unit 401 detects what kind of operation input is made by the user from the operation detection signal received from the sensor controller 406, and executes control processing according to the detection result.

The proximity wireless communication unit 407 is a communication unit for wireless communication with another mobile phone terminal. In this example, a communication unit of the Bluetooth (registered trademark) standard is employed. It is also possible for this proximity wireless communication unit 407 to have a configuration of another communication unit such as an infrared communication unit or a Wi-Fi (registered trademark) communication unit.

The memory 408 is a storing unit of various kinds of data used in the mobile phone terminal 40. In this embodiment, the memory 408 has a memory area of application programs and so forth although not depicted in the diagram.

Figure 13:
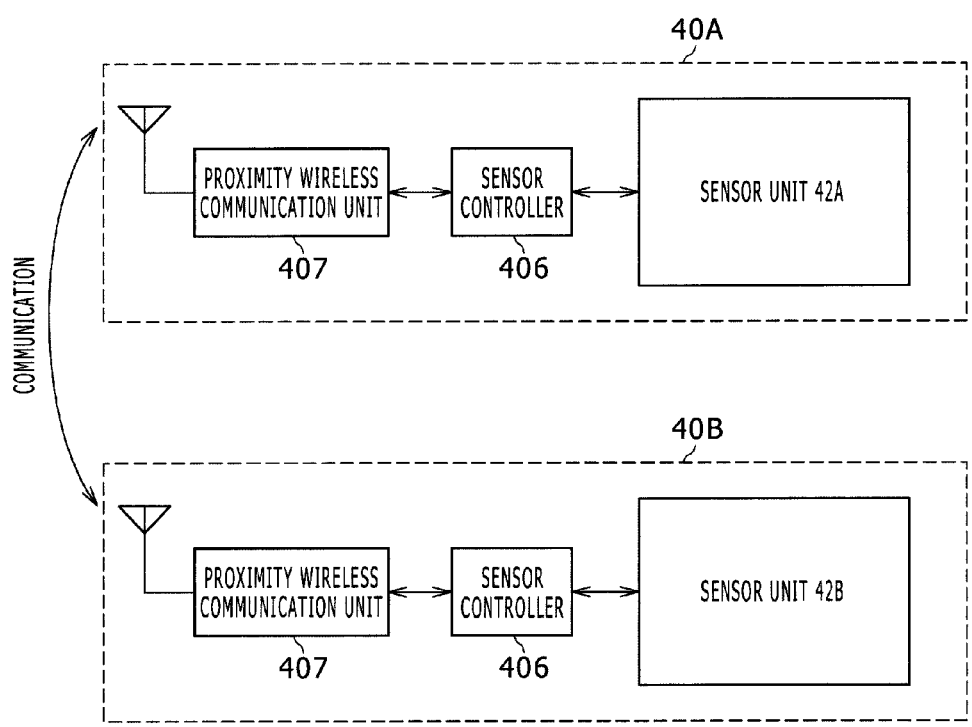
FIG. 13 is a diagram for explaining part of the electronic apparatus according to the third embodiment of this disclosure.

FIG. 13 is a diagram for explaining a configuration for control of the sensor units 42A and 42B in the case in which the above-described application in which an object is copied or moved between two mobile phone terminals is activated in the mobile phone terminals 40A and 40B having the above-described configuration as an example of the electronic apparatus of the third embodiment.

Specifically, the mobile phone terminals 40A and 40B carry out, in the sensor controller 406 of each of them, scan control of the sensor unit 414 of each of them, i.e., the sensor units 42A and 42B, and processing control for position detection of the position indicator 22. Furthermore, in the case in which the application in which an object is copied or moved between two mobile phone terminals is activated, the mobile phone terminals 40A and 40B transmit and receive, by each other's proximity wireless communication units 407, the output of position detection of the position indicator 22 in each of the sensor units 42A and 42B, detected by each of the sensor controllers 406. Then, each of the proximity wireless communication units 407 supplies the received output of the position detection of the position indicator 22 in the sensor unit of the other mobile phone terminal to the sensor controller 406.

Each of the sensor controllers 406 carries out scan control similar to that in the above-described second embodiment from the result of the position detection of the position indicator 22 in the sensor unit 414 of the self-terminal and the result of the position detection of the position indicator 22 in the sensor unit 414 of the other mobile phone terminal, acquired from the proximity wireless communication unit 407. Specifically, the sensor controller 406 carries out the near-area scan about the sensor unit 414 of the self-terminal when it is detected that the result of the position detection of the position indicator 22 acquired from the other mobile phone terminal is in the near area to the sensor unit 414 of the self-terminal in the indication input surface of the sensor unit 414 of the other mobile phone terminal.

In this case, because the mobile phone terminal 40 does not include a measure to detect whether the other mobile phone terminal is put on the left side of the self-mobile phone terminal or is put on the right side in this example, the sensor controller 406 scans one or plural loop coils existing at each of the edge parts on both left and right sides of the sensor unit of the self-terminal, specifically, e.g., the X-axis direction loop coils X1, X2, Xn−1, and Xn, in the near-area scan.

However, it is obvious that, if it is detected which of the left side and right side of the self-terminal the other mobile phone terminal is put by, e.g., a proximity sensor using light, the near-area scan may be carried out regarding the sensor unit 414 only on one side according to the detection result.

Example of Processing Operation in Mobile Phone Terminal of Embodiment

<Processing Example in Application in which Two Mobile Phone Terminals Collaborate to Carry Out Copy or Movement>

Figure 14:
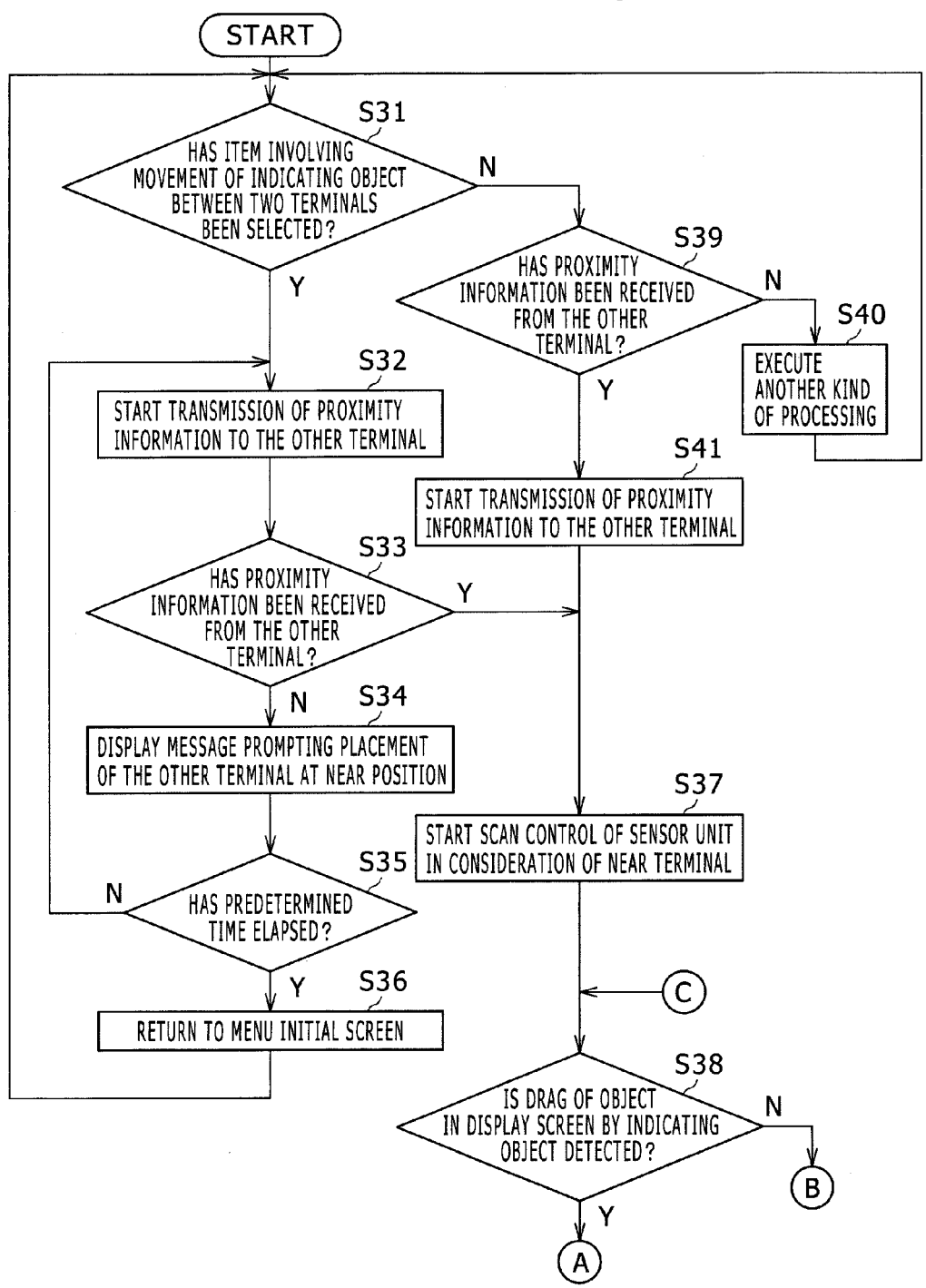
FIG. 14 is a diagram indicating part of a flowchart for explaining a processing operation example of part of the electronic apparatus according to the third embodiment of this disclosure.
Figure 15:
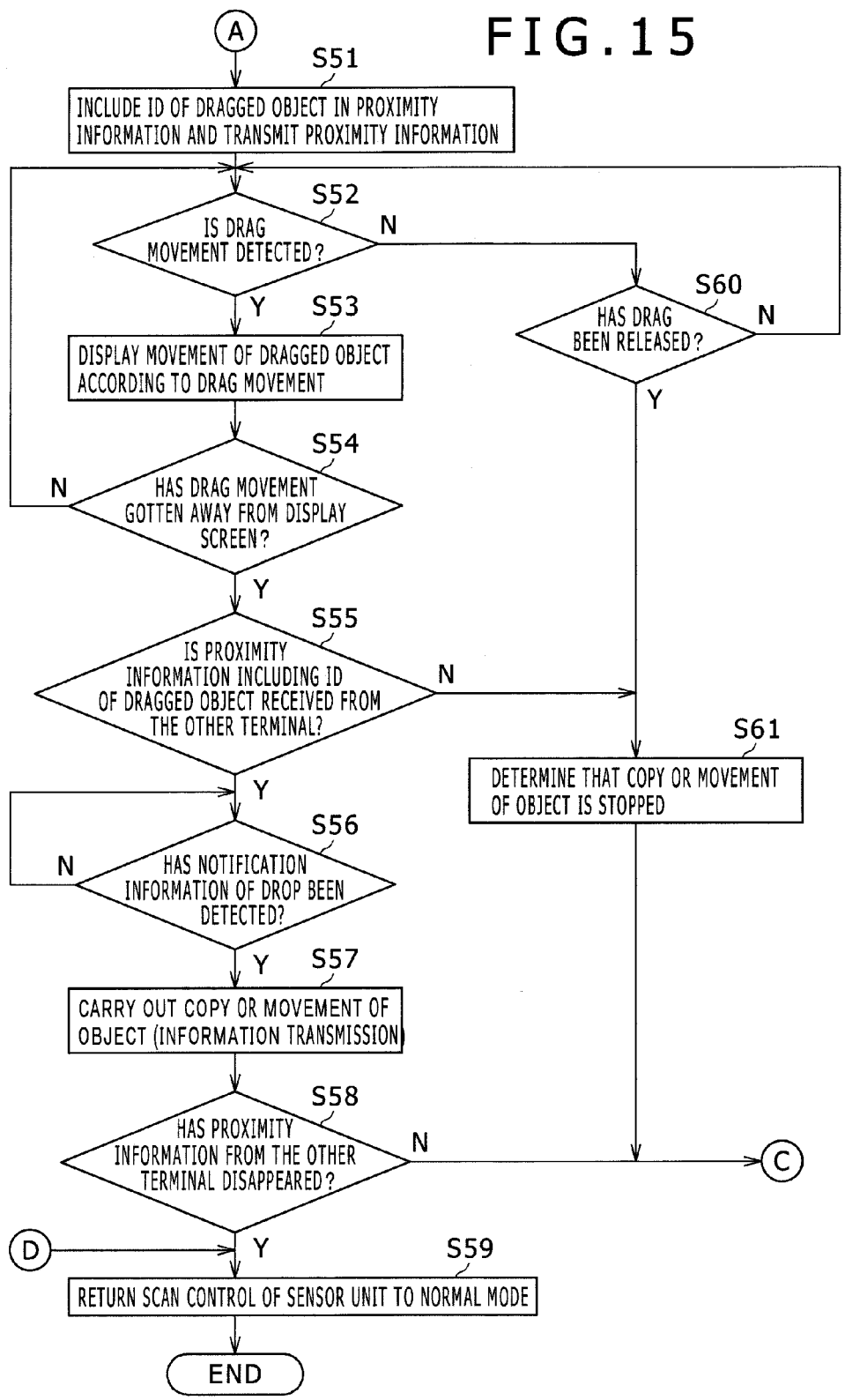
FIG. 15 is another diagram indicating part of the flowchart for explaining the processing operation example of part of the electronic apparatus according to the third embodiment of this disclosure.
Figure 16:
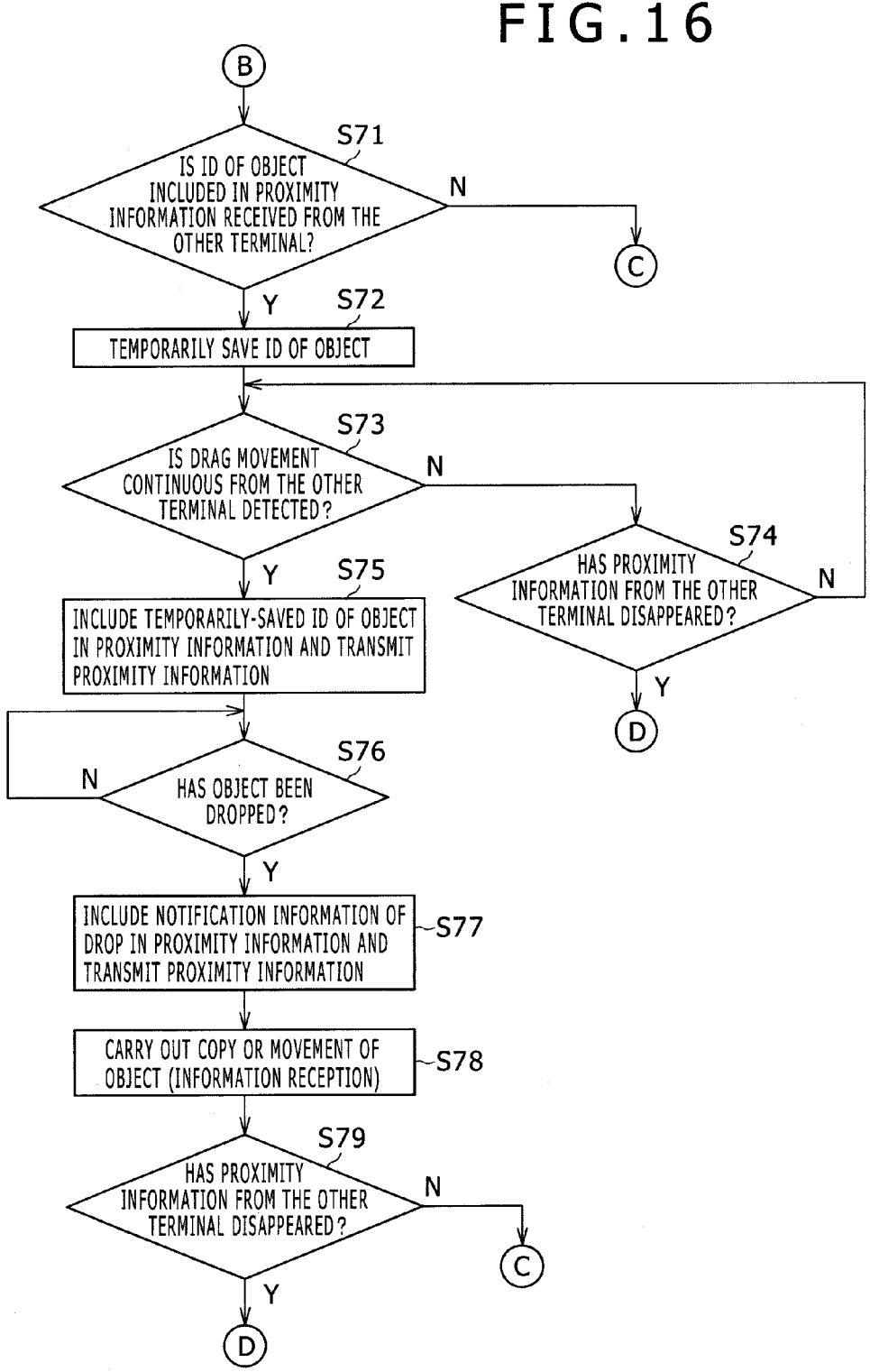
FIG. 16 is still another diagram indicating part of the flowchart for explaining the processing operation example of part of the electronic apparatus according to the third embodiment of this disclosure.

FIGS. 14 to 16 are a flowchart depicting one example of the flow of processing operation of mobile phone terminals in the application in which two mobile phone terminals collaborate to carry out copy or movement. The respective steps in this flowchart are carried out by the control unit 401. In the following description, the indicating object is the position indicator 22 in this example.

First, the control unit 401 of a mobile phone terminal determines whether or not an item of an application involving the movement of the indicating object between two mobile phone terminals close to each other has been selected (step S31). When determining in this step S31 that the item of the application has been selected, the control unit 401 starts processing of transmitting, through the proximity wireless communication unit 407, proximity information for confirmation of each other's proximity placement to the other mobile phone terminal put in the vicinity (step S32).

This proximity information is to determine whether or not the other mobile phone terminal is put aside the self-terminal in order to execute the application. While the application is being executed, this proximity information is transmitted at a constant cycle for example. Furthermore, in this example, position detection information of the position indicator 22 detected in the sensor unit 414 of the self-terminal, information indicating that drag or drop is made, and so forth are included in this proximity information to be transmitted. However, the proximity information including the position detection information of the position indicator 22, the information indicating that drag or drop is made, or another piece of information is transmitted not at the constant cycle but according to need. The position detection information of the position indicator 22, the information indicating that drag or drop is made, and so forth may be transmitted as different information from the proximity information.

Subsequently to the step S32, the control unit 401 determines whether or not proximity information from the other mobile phone terminal has been received (step S33). When determining that proximity information has not been received, the control unit 401 displays a message prompting placement of the other mobile phone terminal at a near position to the self-terminal on the display screen of the display 413 (step S34). Then, the control unit 401 determines whether or not a predetermined time has elapsed (step S35). When determining that the predetermined time has not elapsed after the application is launched, the control unit 401 returns the processing to the step S32 to repeat the processing of this step S32 and the subsequent steps. When determining in the step S35 that the predetermined time has elapsed after the application is launched, the control unit 401 returns the processing to the step S31 to repeat the processing of this step S31 and the subsequent steps.

When determining in the step S33 that proximity information from the other mobile phone terminal has been received, the control unit 401 starts scan control of the sensor unit in consideration of the near mobile phone terminal (step S37). The processing of the scan control in this step S37 is executed by the sensor controller 406. This processing will be described in detail later by using FIG. 17.

Next, the control unit 401 determines whether or not a drag operation of an object displayed on the display screen of the display 413 is carried out by the indicating object on the basis of the detection output of the sensor controller 406 (step S38).

When determining in the step S31 that the item of the application involving the movement of the indicating object between two mobile phone terminals close to each other has not been selected, the control unit 401 determines whether or not proximity information has been received from the other mobile phone terminal (step S39). When determining that proximity information has not been received, the control unit 401 executes another kind of processing (step S40) and, after the end of this processing, returns the processing to the step S31 to repeat the processing of this step S31 and the subsequent steps.

When determining in the step S39 that proximity information has been received from the other mobile phone terminal, the control unit 401 starts transmission of proximity information to the other mobile phone terminal (step S41). That is, when receiving proximity information from the other mobile phone terminal, the self-terminal also starts transmission of proximity information to thereby confirm that the terminals are disposed close to each other. After this step S41, the control unit 401 proceeds to the step S37 to execute the processing of this step S37 and the subsequent steps.

When determining in the step S38 that a drag operation of an object displayed on the display screen of the display 413 is carried out by the indicating object, the control unit 401 includes identification information (hereinafter, referred to as ID) of the dragged object in proximity information to be transmitted from the self-terminal and transmits the proximity information to the other mobile phone terminal (step S51 in FIG. 15).

Next, the control unit 401 determines whether or not the movement of the object with keeping of the drag is detected on the basis of the detection output of the sensor controller 406 (step S52). When determining that the drag movement is detected, the control unit 401 carries out display control to move the display position of the image of the icon of the dragged object on the display screen of the display 413 on the basis of the detection output of the sensor controller 406 (step S53).

Next, the control unit 401 determines whether or not the movement of the object with keeping of the drag has gone out of the display screen of the self-terminal on the basis of the detection output of the sensor controller 406 (step S54). When determining in this step S54 that the movement of the object with keeping of the drag has not gone out of the display screen of the self-terminal, the control unit 401 returns the processing to the step S52 to repeat the processing of this step S52 and the subsequent steps.

When determining in this step S54 that the movement of the object with keeping of the drag has gone out of the display screen of the self-terminal, the control unit 401 determines whether or not proximity information in which the ID of the object moved with the drag is included is received from the other mobile phone terminal (step S55). When determining in this step S55 that proximity information in which the ID of the object moved with the drag is included is not received from the other mobile phone terminal, the control unit 401 determines that the processing of copy or movement of the object is stopped (step S61), and returns the processing to the step S38 to repeat the processing of this step S38 and the subsequent steps.

When determining in the step S55 that proximity information in which the ID of the object moved with the drag is included is received from the other mobile phone terminal, the control unit 401 waits for reception of proximity information including a notification indicating that a drop operation has been carried out (step S56). When confirming reception of proximity information including a notification indicating that a drop operation has been carried out, the control unit 401 carries out copy or movement of substantial information of the dropped object (step S57). In this step S57, the control unit 401 reads out the substantial information of the relevant object from the memory 408 on the basis of the ID of the object and transmits the substantial information to the other mobile phone terminal through the proximity wireless communication unit 407.

Next, the control unit 401 determines whether or not it has become impossible to receive the proximity information from the other mobile phone terminal (step S58). When determining that it has become impossible to receive the proximity information from the other mobile phone terminal, the control unit 401 returns the scan control about the sensor unit 414 from the scan control of the sensor unit in consideration of the near mobile phone terminal for the application to the scan control at the time of the normal mode (step S59). Then, the control unit 401 ends this processing routine. When determining in the step S58 that the reception of the proximity information from the other mobile phone terminal is continuing, the control unit 401 returns the processing to the step S38 to repeat the processing of this step S38 and the subsequent steps.

When determining in the step S52 that the movement of the object with keeping of the drag is not detected, the control unit 401 determines whether or not the drag by the indicating object has been released on the basis of the detection output of the sensor controller 406 (step S60). The control unit 401 returns the processing to the step S52 when determining that the drag has not been released, and makes transition of the processing to the step S61 when determining that the drag has been released.

When determining in the step S38 in FIG. 14 that a drag operation of an object displayed on the display screen of the display 413 is not carried out by the indicating object, the control unit 401 determines whether or not the ID of an object is included in proximity information received from the other mobile phone terminal (step S71 in FIG. 16).

When determining in this step S71 that the ID of an object is not included in proximity information received from the other mobile phone terminal, the control unit 401 returns the processing to the step S38 to repeat the processing of this step S38 and the subsequent steps.

When determining in this step S71 that the ID of an object is included in proximity information received from the other mobile phone terminal, the control unit 401 temporarily saves the received ID of the object (step S72). Next, the control unit 401 determines whether or not drag movement continuous from the other mobile phone terminal by the indicating object is detected on the basis of the detection output of the sensor controller 406 (step S73). In this step S73, practically the control unit 401 determines whether or not the indicating object that moves from the left or right end toward the center is detected in the sensor unit 414.

When determining in the step S73 that drag movement continuous from the other mobile phone terminal by the indicating object is not detected, the control unit 401 determines whether or not it has become impossible to receive the proximity information from the other mobile phone terminal (step S74). When determining in the step S74 that it has not become impossible to receive the proximity information from the other mobile phone terminal, the control unit 401 returns the processing to the step S73. When determining that it has become impossible to receive the proximity information from the other mobile phone terminal, the control unit 401 makes transition of the processing to the step S59 to return the scan control of the sensor unit 414 to the normal mode, and then ends this processing routine.

When determining in the step S73 that drag movement continuous from the other mobile phone terminal by the indicating object is detected, the control unit 401 includes the temporarily-saved ID of the object in proximity information and transmits the proximity information to the other mobile phone terminal (step S75). Next, the control unit 401 monitors the detection output of the sensor controller 406 and waits for execution of drop operation about the object (step S76).

Then, when determining in the step S76 that a drop operation about the object has been carried out, the control unit 401 includes drop notification information in proximity information and transmits the proximity information to the other mobile phone terminal (step S77). Then, the control unit 401 carries out copy or movement of substantial information of the object (step S78). In this step S78, the substantial information of the object identified by the ID is transmitted from the other mobile phone terminal to the self-terminal. Thus, the control unit 401 receives the substantial information by the proximity wireless communication unit 407 to associate the substantial information with the ID of this object and write the substantial information to the memory 408.

Next, the control unit 401 determines whether or not it has become impossible to receive the proximity information from the other mobile phone terminal (step S79). When determining that it has not become impossible to receive the proximity information from the other mobile phone terminal, the control unit 401 returns the processing to the step S38 to repeat the processing of this step S38 and the subsequent steps. When determining that it has become impossible to receive the proximity information from the other mobile phone terminal, the control unit 401 makes transition of the processing to the step S59 to return the scan control of the sensor unit 414 to the normal mode, and then ends this processing routine.

<Processing Examples in Scan Control of Sensor Unit in Consideration of Near Mobile Phone Terminal>

Next, processing examples of the scan control carried out in the step S37 will be described.

First Example

Figure 17:
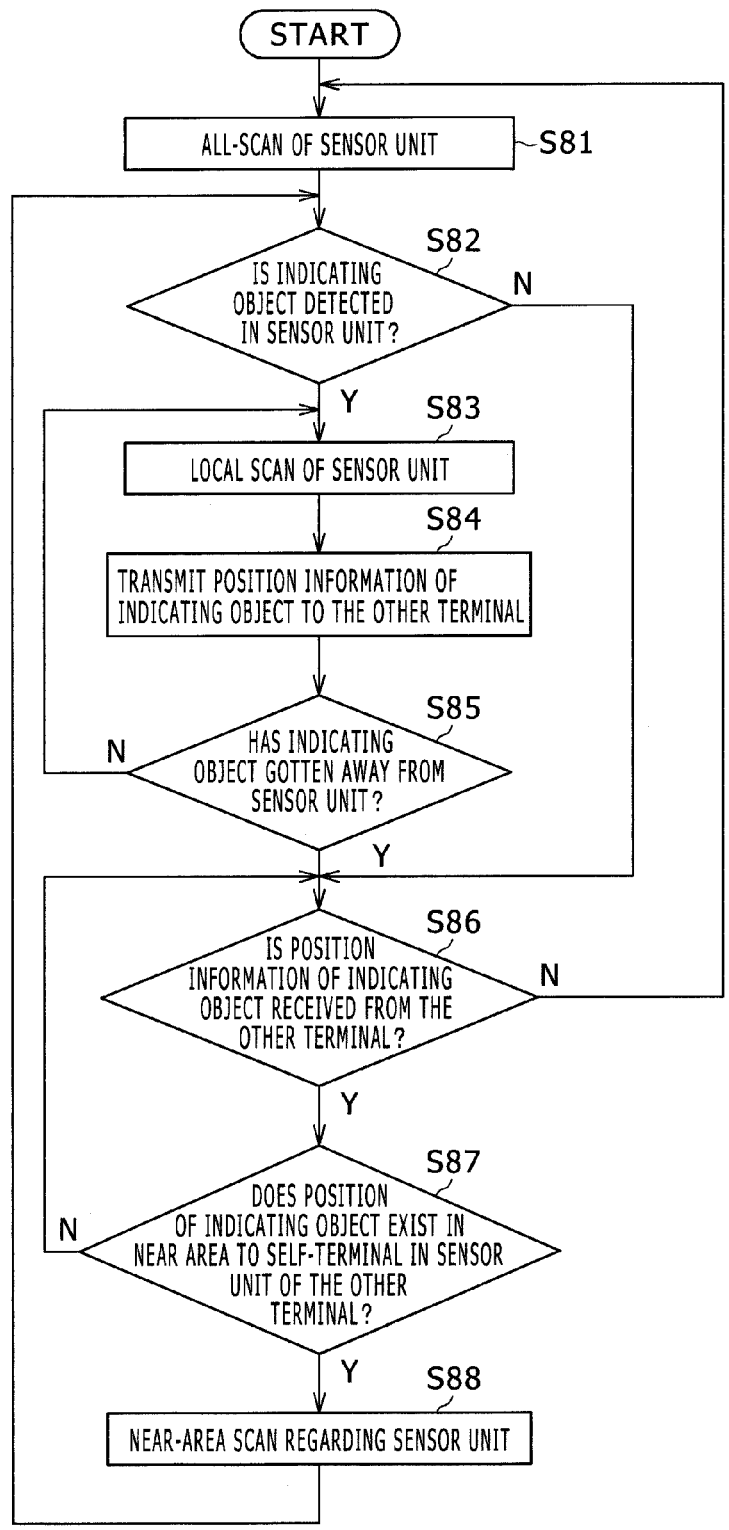
FIG. 17 is a diagram indicating a flowchart for explaining a processing operation example of part of the electronic apparatus according to the third embodiment of this disclosure.

FIG. 17 is a flowchart for explaining a first processing example of the scan control carried out in the step S37. The processing of the respective steps in this flowchart is executed by the sensor controller 406 under control by the control unit 401. It is also possible that the control unit 401 executes also the processing of the sensor controller 406 by a software program.

In the example of FIG. 17, in the state in which the indicating object is not being detected in the sensor unit 414, first the sensor controller 406 carries out the all-scan at a cycle of, e.g., 125 milliseconds regarding the sensor unit 414 as described above (step S81). Next, the sensor controller 406 determines whether or not the indicating object is detected in the sensor unit 414 (step S82). When determining that the indicating object is detected, the sensor controller 406 carries out the local scan at a near position to the detected position of the indicating object at a cycle of, e.g., 7.5 milliseconds as described above (step S83).

Then, the sensor controller 406 transfers position information of the detected indicating object to the control unit 401 to include the position information in proximity information and transmit the position information of the indicating object to the other mobile phone terminal (step S84).

Next, the sensor controller 406 determines whether or not it has become impossible to detect the indicating object in the sensor unit 414 (step S85). When determining that it has not become impossible to detect the indicating object, the sensor controller 406 returns the processing to the step S83 to repeat the processing of this step S83 and the subsequent steps. When determining in the step S85 that it has become impossible to detect the indicating object, the sensor controller 406 determines whether or not position information of the indicating object can be acquired from proximity information received from the other mobile phone terminal (step S86). Also when determining in the step S82 that the indicating object is not detected in the sensor unit 414, the sensor controller 406 makes transition of the processing to the step S86.

When determining in this step S86 that position information of the indicating object is not acquired from the other mobile phone terminal, the sensor controller 406 returns the processing to the step S81 to repeat the processing of this step S81 and the subsequent steps. When determining in the step S86 that position information of the indicating object is acquired from the other mobile phone terminal, the sensor controller 406 determines, on the basis of the position information, whether or not the position of the indicating object detected in the sensor unit 414 of the other mobile phone terminal exists in the near area to the self-terminal in the indication input surface of the sensor unit 414 (in this example, both left and right ends of the indication input surface of the sensor unit 414) (step S87).

When determining in this step S87 that the position of the indicating object does not exist in the near area to the self-terminal in the indication input surface of the sensor unit 414 of the other mobile phone terminal, the sensor controller 406 returns the processing to the step S86 to repeat the processing of this step S86 and the subsequent steps.

When determining in the step S87 that the position of the indicating object exists in the near area to the self-terminal in the indication input surface of the sensor unit 414 of the other mobile phone terminal, the sensor controller 406 carries out the near-area scan regarding the sensor unit 414 of the self-terminal (in this example, scan of loop coils at both left and right ends of the indication input surface of the sensor unit 414) (step S88). Then, the sensor controller 406 returns the processing to the step S82 to repeat the processing of this step S82 and the subsequent steps.

Second Example

Figure 18:
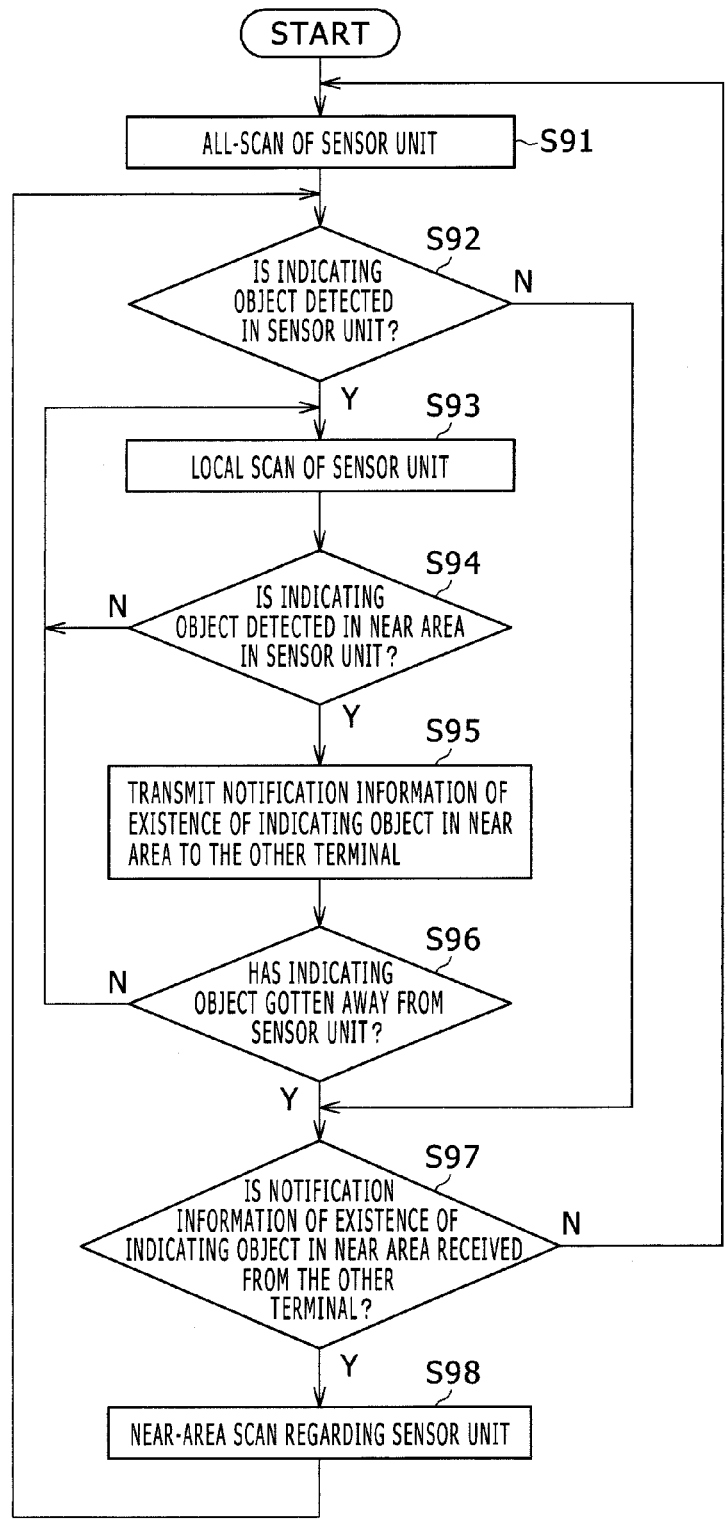
FIG. 18 is a diagram indicating a flowchart for explaining a processing operation example of part of the electronic apparatus according to the third embodiment of this disclosure.

FIG. 18 is a flowchart for explaining a second processing example of the scan control carried out in the step S37.

In the state in which the indicating object is not being detected in the sensor unit 414, first the sensor controller 406 carries out the all-scan at a cycle of, e.g., 125 milliseconds regarding the sensor unit 414 as described above (step S91). Next, the sensor controller 406 determines whether or not the indicating object is detected in the sensor unit 414 (step S92). When determining that the indicating object is detected, the sensor controller 406 carries out the local scan at a near position to the detected position of the indicating object at a cycle of, e.g., 7.5 milliseconds as described above (step S93).

Next, on the basis of position information of the detected indicating object, the sensor controller 406 determines whether or not the position of the indicating object detected in the sensor unit 414 exists in the near area to the other mobile phone terminal in the self-terminal (in this example, both left and right ends of the indication input surface of the sensor unit 414) (step S94). When determining in this step S94 that the position of the indicating object does not exist in the near area to the other mobile phone terminal in the self-terminal, the sensor controller 406 returns the processing to the step S93 to repeat the processing of this step S93 and the subsequent steps.

When determining in this step S94 that the position of the indicating object exists in the near area to the other mobile phone terminal in the self-terminal, the sensor controller 406 requests the control unit 401 to include notification information of the existence of the indicating object in the near area in proximity information and transmit the proximity information to the other mobile phone terminal (step S95).

Next, the sensor controller 406 determines whether or not it has become impossible to detect the indicating object in the sensor unit 414 (step S96). When determining that it has not become impossible to detect the indicating object, the sensor controller 406 returns the processing to the step S93 to repeat the processing of this step S93 and the subsequent steps. When determining in the step S96 that it has become impossible to detect the indicating object, the sensor controller 406 determines whether or not notification information of the existence of the indicating object in the near area can be acquired from proximity information received from the other mobile phone terminal (step S97). Also when determining in the step S92 that the indicating object is not detected in the sensor unit 414, the sensor controller 406 makes transition of the processing to the step S97.

When determining in this step S97 that notification information of the existence of the indicating object in the near area is not acquired from the other mobile phone terminal, the sensor controller 406 returns the processing to the step S91 to repeat the processing of this step S91 and the subsequent steps. When determining in the step S97 that notification information of the existence of the indicating object in the near area is acquired from the other mobile phone terminal, the sensor controller 406 carries out the near-area scan regarding the sensor unit 414 of the self-terminal (in this example, scan of loop coils at both left and right ends of the indication input surface of the sensor unit 414) on the basis of the notification information (step S98). Then, the sensor controller 406 returns the processing to the step S92 to repeat the processing of this step S92 and the subsequent steps.

Effects of Third Embodiment

As described above, according to the third embodiment, the movement of the indicating object between the sensor units of two electronic apparatuses can be detected with a favorable following characteristic. Thus, processing by the application involving the movement of the indicating object between two electronic apparatuses disposed close to each other can be favorably executed.

Modification Examples of Third Embodiment

In the above-described third embodiment, the case in which two electronic apparatuses carry out copy or movement of an object stored in the memory unit included in one of the electronic apparatuses is described. However, the third embodiment can be applied also to the case in which substantial data of an object is stored in a storing unit such as a server that can be accessed through a network such as the Internet although the object is managed by electronic apparatus, i.e., the case of a so-called cloud service.

Furthermore, although this disclosure is applied to the case of the application relating to copy or movement of an object in the above-described third embodiment, it is obvious that the application to which this disclosure can be applied is not limited to the above-described example. For example, this disclosure can be applied when operation accompanied by movement among plural screens by an indicating object is assumed in a game using the plural screens.

Although the movement of an indicating object between two electronic apparatuses is explained in the above description of the third embodiment, this disclosure can be similarly applied also to the case of considering the movement of the indicating object among three or more electronic apparatuses.

Also in this third embodiment, when determining that notification information of the existence of the indicating object in the near area is acquired, the sensor controller 406 may carry out the near-area scan and the all-scan in a time-sharing manner regarding the sensor unit 414 of the self-terminal based on the notification information similarly to the above-described second embodiment.

Other Embodiments or Modification Examples

In the above-described first embodiment and second embodiment, one sensor controller common to plural sensor units is provided. However, the sensor controller may be provided for each sensor unit. In this case, position detection information of an indicating object detected by other sensor controllers is mutually transmitted and received among the respective sensor controllers similarly to the third embodiment.

Figure 19:
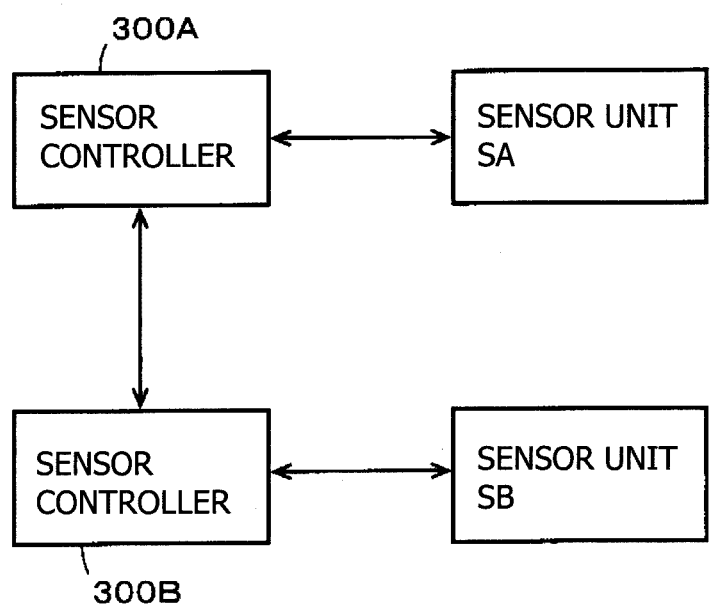
FIG. 19 is a diagram for explaining the outline of part of another configuration example of the electronic apparatus according to the second embodiment of this disclosure.

For example, when this is applied to the case of the second embodiment, a configuration is made as indicated in FIG. 19. Specifically, in this example, a sensor controller 300A is provided for the sensor unit SA and a sensor controller 300B is provided for the sensor unit SB. Furthermore, a connection is established also between the sensor controller 300A and the sensor controller 300B. The output of position detection of the indicating object detected by the sensor controller 300A is supplied to the sensor controller 300B and the output of position detection of the indicating object detected by the sensor controller 300B is supplied to the sensor controller 300A.

The sensor controllers 300A and 300B are configured similarly to the sensor controller 406 of the above-described third embodiment.

In the above embodiments, the sensor units each have a configuration of a sensor unit of the electromagnetic induction system. However, it is obvious that this disclosure is not applied only to the sensor unit of the electromagnetic induction system but can be applied also to a sensor unit of another system, e.g., a sensor unit of the capacitive system.

Figure 20:
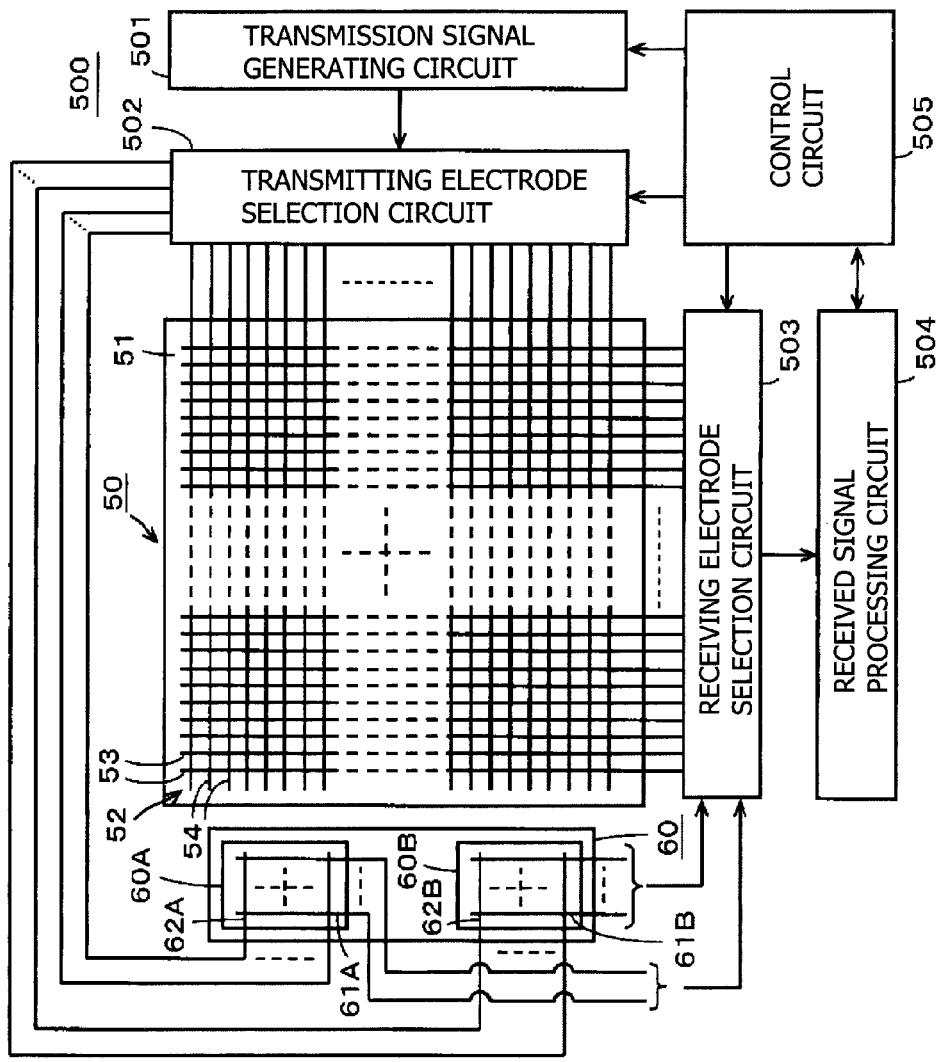
FIG. 20 is a block diagram of part of another configuration example of the electronic apparatus according to the first embodiment of this disclosure.
Figure 21A:
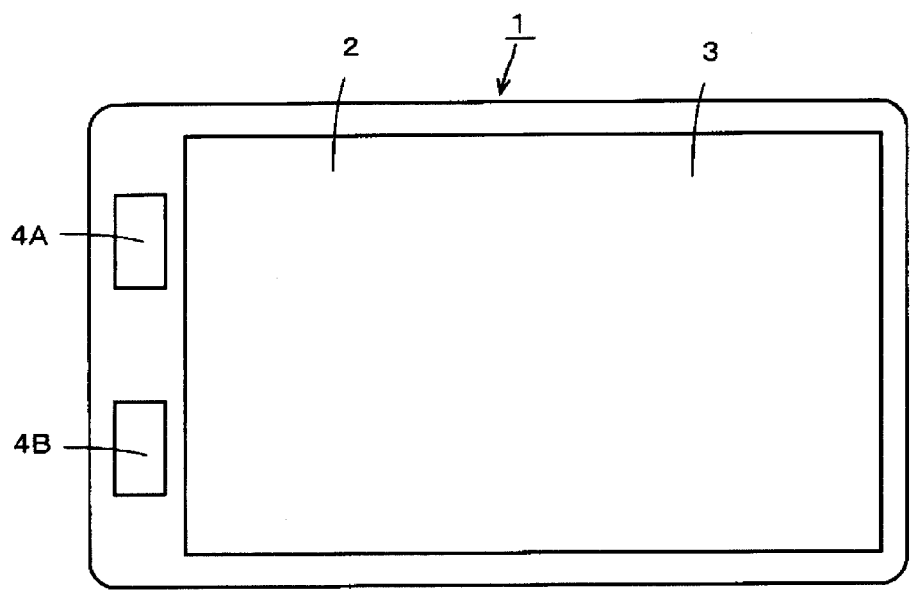
FIGS. 21A and 21B are diagrams for explaining a configuration example of an electronic apparatus of a related art.
Figure 21B:
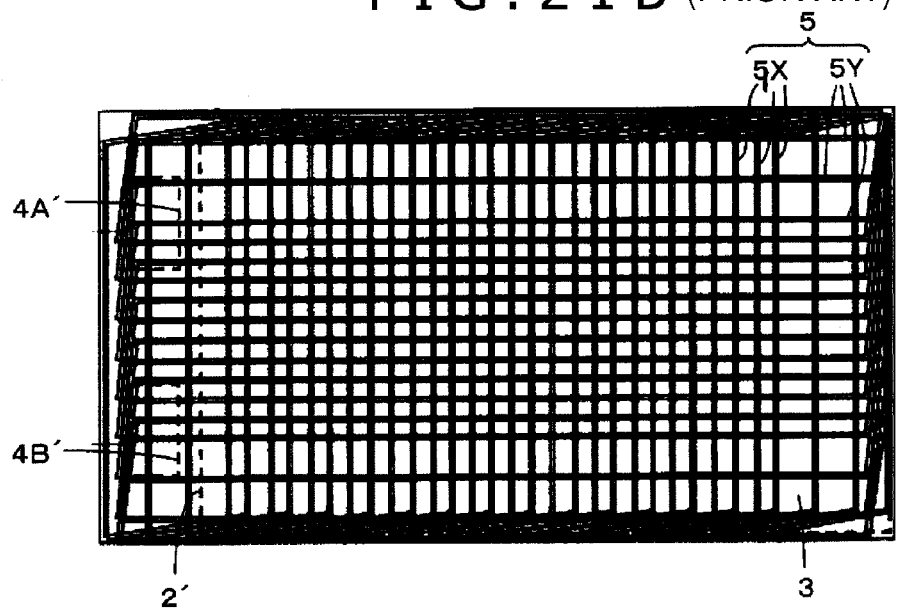

FIG. 20 indicates a configuration example of the case in which sensor units of the capacitive system are used as the sensor units in the first embodiment. In this example of FIG. 20, a display-corresponding sensor unit 50 of the capacitive system is provided instead of the display-corresponding sensor unit 13 and a key-corresponding sensor unit 60 of the capacitive system is provided instead of the key-corresponding sensor unit 16.

In this example, the display-corresponding sensor unit 50 has a configuration of a sensor of the cross-point capacitive system and is configured by forming a transparent electrode group 52 over one surface of a transparent substrate 51. The transparent electrode group 52 is composed of plural transparent electrodes 53 disposed along the Y-axis direction and plural transparent electrodes 54 disposed along the X-axis direction orthogonal to the Y-axis direction.

The key-corresponding sensor unit 60 is configured with a first sensor unit 60A composed of plural transparent electrodes 61A arranged in the X-axis direction and plural transparent electrodes 62A arranged in the Y-axis direction and a first sensor unit 60B composed of plural transparent electrodes 61B arranged in the X-axis direction and plural transparent electrodes 62B arranged in the Y-axis direction.

As indicated in FIG. 20, a sensor controller 500 includes a transmission signal generating circuit 501, a transmitting electrode selection circuit 502, a receiving electrode selection circuit 503, a received signal processing circuit 504, and a control circuit 505.

The transmission signal generating circuit 501 supplies a predetermined transmission signal to the transmitting electrode selection circuit 502 at a predetermined timing according to control by the control circuit 505. The transmitting electrode selection circuit 502 selects the transparent electrode 54 of the display-corresponding sensor unit 50 and selects the transparent electrode 62A or the transparent electrode 62B of the key-corresponding sensor unit 60 in accordance with selection control by the control circuit 505. The transmission signal is supplied from the transmission signal generating circuit 501 to the transparent electrode 54 or the transparent electrode 62A or 62B selected by the transmitting electrode selection circuit 502.

The receiving electrode selection circuit 503 selects the transparent electrode 53 of the display-corresponding sensor unit 50 and selects the transparent electrode 61A or 61B of the key-corresponding sensor unit 60 in accordance with control by the control circuit 505. The receiving electrode selection circuit 503 supplies a received signal from the selected transparent electrode 53 or transparent electrode 61A or 61B to the received signal processing circuit 504.

On the basis of control by the control circuit 505, the received signal processing circuit 504 processes the received signal and detects, by the transparent electrode 53 or the transparent electrode 61A or 61B, a signal change caused by indication of a position by an indicating object such as a finger or a position indicator over the display-corresponding sensor unit 50 or the key-corresponding sensor unit 60 to supply the detection output to the control circuit 505.

From the detection output of the received signal processing circuit 504, the control circuit 505 generates a coordinate output that is an indicated position detection signal corresponding to the position indicated by the indicating object such as a finger or a position indicator from the transparent electrode 53 or the transparent electrode 61A or 61B in which the signal change is caused and the transparent electrode 54 or the transparent electrode 62A or 62B to which the transmission signal is being supplied at the time.

Furthermore, the control circuit 505 carries out control to make the all-scan, the local scan, and the near-area scan in the display-corresponding sensor unit 50 similarly to the above-described first embodiment.

It is obvious that the sensor units SA and SB in the second embodiment and the sensor unit 414 in the third embodiment may also have a configuration of a sensor unit of the capacitive system and have a configuration provided with a sensor controller like that indicated in the above-described FIG. 20.

In the above-described first embodiment, for both the display-corresponding sensor unit 13 and the key-corresponding sensor unit 16, sensors of the same kind of detection system are used as sensor units of the electromagnetic induction system. However, a configuration may be employed in which the display-corresponding sensor unit 13 and the key-corresponding sensor unit 16 are sensor units of different detection systems. For example, the display-corresponding sensor unit 13 may be a sensor unit of the capacitive system and the key-corresponding sensor unit 16 may have a configuration of a sensor unit of the electromagnetic induction system, and vice versa.

Furthermore, as the display-corresponding sensor unit 13, a configuration in which sensor units of different detection systems are provided in an overlapping manner may be employed. Specifically, for example, a sensor unit of the electromagnetic induction system may be provided on the lower side of the display screen 12 in an overlapping manner and a sensor unit of the capacitive system may be provided on the upper side of the display screen 12 in an overlapping manner. The key-corresponding sensor unit 16 can also be similarly configured. In this case, both the display-corresponding sensor unit 13 and the key-corresponding sensor unit 16 may have the configuration in which sensor units of different detection systems are provided in an overlapping manner or only one of them may have the configuration in which sensor units of different detection systems are provided in an overlapping manner.

Also in the second embodiment, the sensor unit SA and the sensor unit SB may have a configuration of sensor units of detection systems different from each other. Furthermore, as each of the sensor unit SA and the sensor unit SB or as one of the sensor unit SA and the sensor unit SB, a configuration in which sensor units of different detection systems are provided in an overlapping manner may be employed.

Moreover, the sensor units 42A and 42B of two mobile phone terminals 40A and 40B in the third embodiment may have a configuration of sensor units of detection systems different from each other. Furthermore, as each of the sensor unit 42A and the sensor unit 42B or as one of the sensor unit 42A and the sensor unit 42B, a configuration in which sensor units of different detection systems are provided in an overlapping manner may be employed.

It is to be noted that the present disclosure is not limited to the foregoing embodiments, and that various changes can be made without departing from the spirit of the present disclosure.

What is claimed is:
1. An electronic apparatus comprising:
a first sensor including a first indication input surface configured for detecting a position indicated by an indicating object;
a second sensor including a second indication input surface configured for detecting the indicating object, the second indication input surface being disposed adjacent to the first indication input surface of the first sensor in a direction along a surface direction of the first indication input surface; and
a controller configured to control a scan operation for detecting the position indicated by the indicating object in the first indication input surface of the first sensor when the indicating object is detected in the second sensor, wherein:
the controller, in operation, controls the scan operation in a near area to the second sensor in the first indication input surface of the first sensor,
when the indicating object is not being detected in the first sensor, the controller carries out an overall scan of scanning a whole area of the first indication input surface in order to detect the position indicated by the indicating object, and, when the position indicated by the indicating object is detected, the controller carries out a partial scan of scanning only a near area to the detected indicated position in order to detect the position indicated by the indicating object, and
when the indicating object is detected in the second sensor, the controller carries out a scan for detecting the

33 position indicated by the indicating object only in the near area to the second sensor instead of the overall scan.

2. The electronic apparatus according to claim 1, wherein the first sensor and the second sensor detect the indicating object by a same kind of detection system.

3. The electronic apparatus according to claim 1, wherein the second sensor, in operation, detects the position indicated by the indicating object in the second indication input surface, and
when the indicating object is detected in one of the first sensor and the second sensor, the controller controls the scan operation for detecting the position indicated by the indicating object in the other of the first sensor and the second sensor.

4. The electronic apparatus according to claim 1, wherein a size of the first indication input surface of the first sensor is different from a size of the second indication input surface of the second sensor.

5. The electronic apparatus according to claim 1, wherein the first sensor and the second sensor are each formed of a sensor of an electromagnetic induction system or a sensor of a capacitive system.

6. The electronic apparatus according to claim 1, wherein the first sensor is disposed such that the first indication input surface overlaps with a display screen of a display device.

7. The electronic apparatus according to claim 1, wherein the controller carries out control to make a pause in the scan operation for detecting the position indicated by the indicating object in the first indication input surface of the first sensor when the indicating object is detected in the second sensor.

8. An electronic apparatus comprising:
a first sensor including a first indication input surface configured for detecting a position indicated b an indicating object;
a second sensor including a second indication input surface configured for detecting the indicating object, the second indication input surface being disposed adjacent to the first indication input surface of the first sensor in a direction along a surface direction of the first indication input surface; and
a controller configured to control a scan operation for detecting the position indicated by the indicating object in the first indication input surface of the first sensor when the indicating object is detected in the second sensor, wherein:
the second sensor is configured to detect the position indicated by the indicating object in the second indication input surface, and
when the indicating object is detected in one of a near area to the second sensor in the first indication input surface of the first sensor and a near area to the first sensor in the second indication input surface of the second sensor, the controller controls the scan operation for detecting the position indicated by the indicating object in the other of the first sensor and the second sensor,
when the indicating object is not being detected, the controller carries out an overall scan of scanning a whole area of the first indication input surface in order to detect the position indicated by the indicating object, and, when the position indicated by the indicating object is detected, the controller carries out a partial scan of scanning only a near area to the detected indicated position in order to detect the position indicated by the indicating object, and

34 when the indicating object is detected in one of the first sensor and the second sensor, the controller carries out a scan for detecting the position indicated by the indicating object only in the near area to the one of the first sensor and the second sensor instead of the overall scan.

9. The electronic apparatus according to claim 8, wherein the first sensor is disposed such that the first indication input surface overlaps with a first display screen of a display device, and the second sensor is disposed such that the second indication input surface overlaps with a second display screen of the display device.

10. The electronic apparatus according to claim 8, wherein
the first sensor and the second sensor detect the indicating object by a same kind of detection system.

11. The electronic apparatus according to claim 8, wherein:
the second sensor, in operation, detects the position indicated by the indicating object in the second indication input surface, and
when the indicating object is detected in one of the first sensor and the second sensor, the controller controls the scan operation for detecting the position indicated by the indicating object in the other of the first sensor and the second sensor.

12. The electronic apparatus according to claim 8, wherein
a size of the first indication input surface of the first sensor is different from a size of the second indication input surface of the second sensor.

13. A first electronic apparatus comprising:
a sensor including an indication input surface configured for detecting a position indicated by an indicating object;
communication circuitry configured to communicate information with a second electronic apparatus that is adjacent to the first electronic apparatus;
transmitting circuitry configured to transmit first proximity information for notifying a proximity state to the second electronic apparatus through the communication circuitry;
proximity detecting circuitry configured to receive second proximity information from the second electronic apparatus and detects a proximity state of the second electronic apparatus;
indicating object detection notifying circuitry configured to notify the second electronic apparatus of a detection of the indicating object through the communication circuitry when the indicating object is detected in the indication input surface of the sensor;
a controller configured to control a scan operation for detecting the position indicated by the indicating object in the indication input surface of the sensor when receiving a notification of a detection of the indicating object from the second electronic apparatus; and
notification circuitry configured to notify the second electronic apparatus of position information of the indicating object in the indication input surface of the sensor,
wherein the controller, in operation, controls the scan operation for detecting the position indicated by the indicating object in the indication input surface of the sensor when detecting the indicating object in a near area to the first electronic apparatus in an indication input surface of a sensor of the second electronic apparatus based on position information of the indicating object in the indication input surface of the sensor of the second electronic apparatus transmitted from the second electronic apparatus.

14. The first electronic apparatus according to claim 13, wherein
the first electronic apparatus notifies the second electronic apparatus of a detection of the indicating object in a near area to the second electronic apparatus through the communication circuitry when the indicating object is detected in the near area to the second electronic apparatus in the indication input surface of the sensor.

15. The first electronic apparatus according to claim 13, wherein
the controller, in operation, controls the scan operation to detect the position indicated by the indicating object in a near area to the second electronic apparatus in the indication input surface of the sensor.

16. The first electronic apparatus according to claim 13, further comprising
transmission circuitry which, in operation, transmits information associated with the position indicated by the indicating object to the second electronic apparatus through the communication circuitry.

17. An first electronic apparatus comprising:
a sensor including an indication input surface configured for detecting a position indicated by an indicating object;
communication circuitry configured to communicate information with a second electronic apparatus that is adjacent to the first electronic apparatus;
transmitting circuit configured to transmit first proximity information for notifying a proximity state to the second electronic apparatus through the communication circuitry;
proximity detecting circuitry configured to receive second proximity information from the second electronic apparatus and detects a proximity state of the second electronic apparatus;
indicating object detection notifying circuitry configured to notify the second electronic apparatus of a detection of the indicating object through the communication circuitry when the indicating object is detected in the indication input surface of the sensor;
a controller configured to control a scan operation for detecting the position indicated by the indicating object in the indication input surface of the sensor when receiving a notification of a detection of the indicating object from the second electronic apparatus, wherein:
when the indicating object is not being detected, the control controller carries out an overall scan of scanning a whole area of the indication input surface in order to detect the position indicated by the indicating object, and, when the position indicated by the indicating object is detected, the control controller carries out a partial scan of scanning only a near area to the detected indicated position in order to detect the position indicated by the indicating object, and
when the indicating object is detected in a sensor of the second electronic apparatus, the control controller carries out a scan for detecting the position indicated by the indicating object only in a near area to the sensor of the second electronic apparatus instead of the overall scan.

18. The first electronic apparatus according to claim 17, wherein
the first electronic apparatus notifies the second electronic apparatus of a detection of the indicating object in a near area to the second electronic apparatus through the communication circuitry when the indicating object is detected in the near area to the second electronic apparatus in the indication input surface of the sensor.

19. The first electronic apparatus according to claim 17, further comprising:
transmission circuitry which, in operation, transmits information associated with the position indicated by the indicating object to the second electronic apparatus through the communication circuitry.

20. The electronic apparatus according to claim 17, wherein
the controller carries out control to make a pause in the scan operation for detecting the position indicated by the indicating object in the first indication input surface of the first sensor when the indicating object is detected in the second sensor.

* * * * *

UNITED STATES PATENT AND TRADEMARK OFFICE
CERTIFICATE OF CORRECTION

PATENT NO. : 10,013,125 B2
APPLICATION NO. : 15/163121
DATED : July 3, 2018
INVENTOR(S) : Takeshi Kobori It is certified that error appears in the above-identified patent and that said Letters Patent is hereby corrected as shown below:

In the Claims

Column 33, Line 36 Claim 8:
"configured for detecting a position indicated b an"
Should read:
--configured for detecting a position indicated by an--.

Column 35, Line 30 Claim 17:
"transmitting circuit configured to transmit first proximity"
Should read:
--transmitting circuitry configured to transmit first proximity--.

Signed and Sealed this
Sixteenth Day of October, 2018

Andrei Iancu
*Director of the United States Patent and Trademark Office*